(12) United States Patent
Kinoshita et al.

(10) Patent No.: US 7,633,938 B2
(45) Date of Patent: Dec. 15, 2009

(54) TRANSFER SYSTEM

(75) Inventors: Hiroshi Kinoshita, Yokohama (JP); Colin Peters, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/080,971

(22) Filed: Mar. 15, 2005

(65) Prior Publication Data

US 2005/0180431 A1    Aug. 18, 2005

Related U.S. Application Data

(63) Continuation of application No. PCT/JP02/010305, filed on Oct. 2, 2002.

(51) Int. Cl.
*H04L 12/26* (2006.01)

(52) U.S. Cl. ............... 370/389; 370/252; 370/254; 370/401

(58) Field of Classification Search .......... 370/252, 370/254, 401, 238, 536; 709/226, 227, 229
See application file for complete search history.

(56) References Cited

U.S. PATENT DOCUMENTS

| | | | | |
|---|---|---|---|---|
| 6,094,683 | A | * | 7/2000 | Drottar et al. ............ 709/226 |
| 6,333,929 | B1 | * | 12/2001 | Drottar et al. ............ 370/362 |
| 6,549,540 | B1 | * | 4/2003 | Ward ........................ 370/412 |
| 6,646,991 | B1 | * | 11/2003 | Drottar et al. ............ 370/238 |
| 6,665,495 | B1 | * | 12/2003 | Miles et al. ............... 398/54 |
| 7,177,956 | B2 | * | 2/2007 | Mann et al. ............... 710/5 |
| 2002/0018447 | A1 | * | 2/2002 | Yamada et al. ........... 370/252 |

FOREIGN PATENT DOCUMENTS

| | | |
|---|---|---|
| AU | 200021041 | 12/2001 |
| EP | 1 249 119 | 12/2001 |
| JP | 11-098077 | 4/1999 |
| JP | 2000-174818 | 6/2000 |
| JP | 2000-224227 | 8/2000 |
| WO | WO 01/50707 | 7/2001 |

OTHER PUBLICATIONS

Ayan Banerjee, et al. Generalized Multiprotocol Label Switching: An Overview of Routing and Management Enhancements. IEEE Communications Magazine, vol. 39, No. 1, pp. 144 to 150, Jan. 2001.

(Continued)

*Primary Examiner*—Curtis Kuntz
*Assistant Examiner*—Phung-Hoang J Nguyen
(74) *Attorney, Agent, or Firm*—Katten Muchin Rosenman LLP

(57) ABSTRACT

A transfer system for bundle transfer, in which the amount of route information and the number of times advertisement is performed are reduced, and maintenance and management are made to be highly efficient to implement improved transfer quality. A path setting section specifies a path between nodes for a receiving side as a bundled link which can have a plurality of paths tied up. A transmission-side route-information advertisement section advertises route information in a network when recognizing that the path has been established. A path recognition section recognizes the path and sets the path as a bundled link. A receiving-side route-information advertisement section advertises the route information in the network when recognizing that the path has been established.

5 Claims, 49 Drawing Sheets

OTHER PUBLICATIONS

Kireeti Kompella et al. Link Bundling in MPLS Traffic Engineering. Internet Draft, draft-ietf-mpls-bundle-0.4txt, Jul. 2002.

Moto Nakamura et al. Best Effort-gata Tahacho Pass Wariate no tame no Kaisoka DW DM Mo. The Institute of Electronics, Information and Communication Engineers Tsushin Society Koen Rombunshu, Aug. 20, 2002.

Hajime Nakamura, et al. A Layered DWDM Network for Best-Effort Multi-Wavelength Path Assignment. The 2002 IEICE Communications Society Conference. KDDI R&D Laboratories, Inc.

Japanese Office Action dated Apr. 11, 2006, with partial translation.

Kireeti Kompella, et al. "Link Bundling in MPLS Traffic Engineering" Network Working Group, draft-ietf-mpls-bundle-04.txt, Jul. 2002.

Kohei Shiomoto, et al. "Study on Photonic IP Network Architecture" The Institute of Electronics, Information and Communication Engineers, vol. 101, No. 508, Dec. 17, 2001, pp. 127-131.

Norihito Fujita, et al. "Hierarchical Traffic Engineering System for a Large IP Network" The Institute of Electronics, Information and Communication Engineers, vol. 99 No. 507, Dec. 17, 1999, pp. 19-25.

* cited by examiner

Path Message
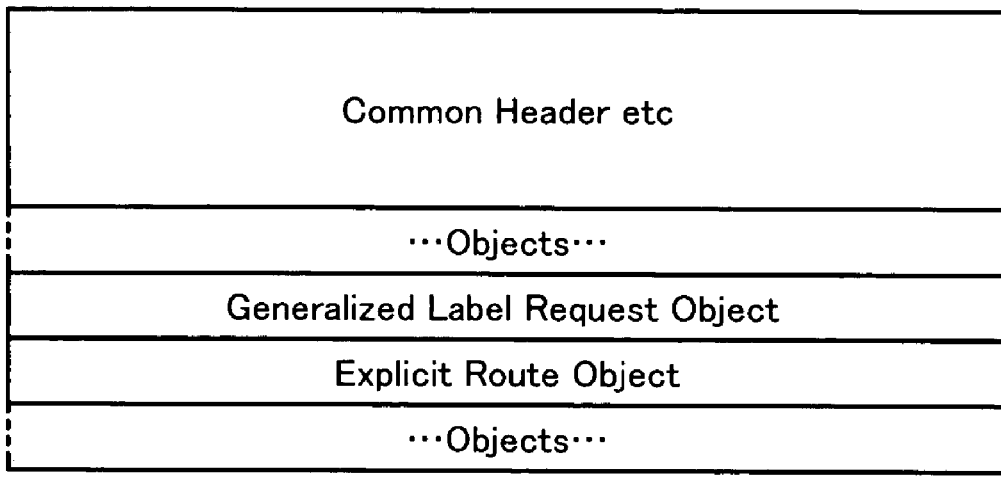
Generalized Label Request Object
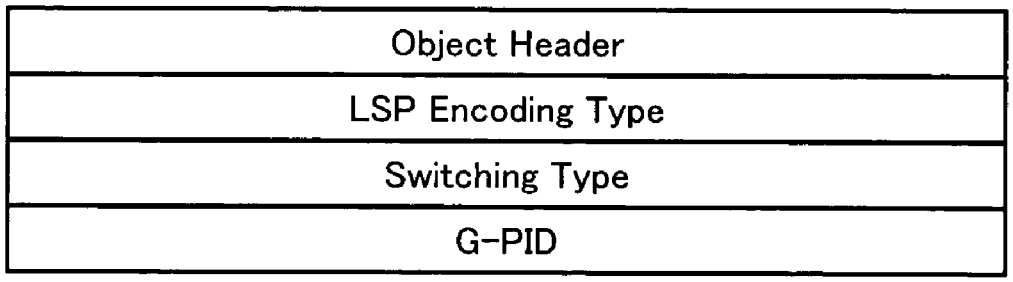
Explicit Route Object (Push Pass-Through Node)
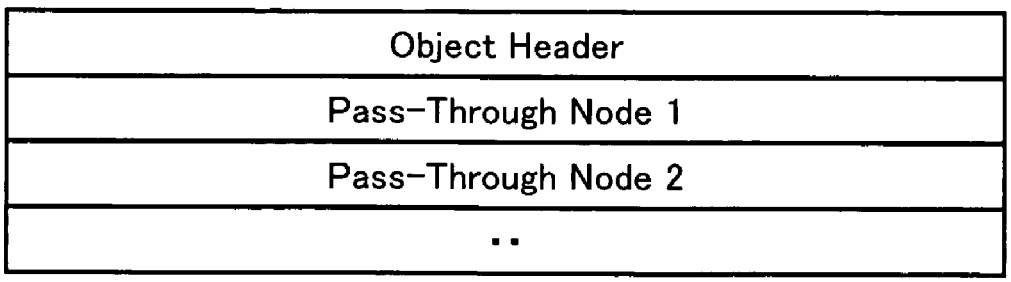
FIG. 4

SETTING INFORMATION IN PATH MESSAGE

| OBJECT NAME | FIELD NAME | SETTING |
| --- | --- | --- |
| Generalized Label Request | LSP Encoding Type | Lambda |
| | Switching Type | LSC (Lambda Switch Capable) |
| | G-PID | SONET |
| Explicit Route | Pass-Through Node 1 | 172.27.170.2(NODE B) |
| | Pass-Through Node 2 | 172.27.170.3(NODE C) |

FIG. 5

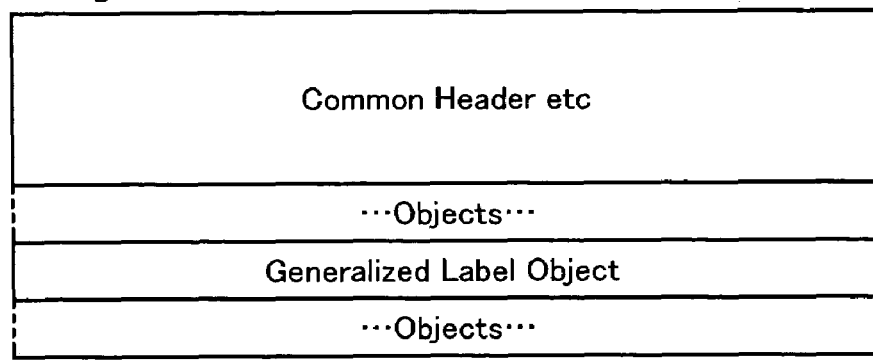
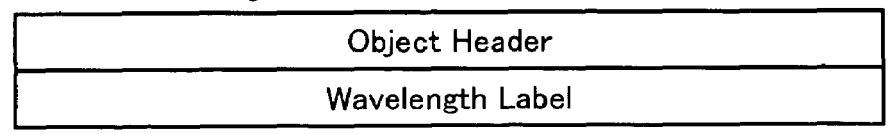
FIG. 6

| OBJECT NAME | FIELD NAME | SETTING |
|---|---|---|
| Generalized Label | Wavelength Label | 2 |

FIG. 7

TE LSA
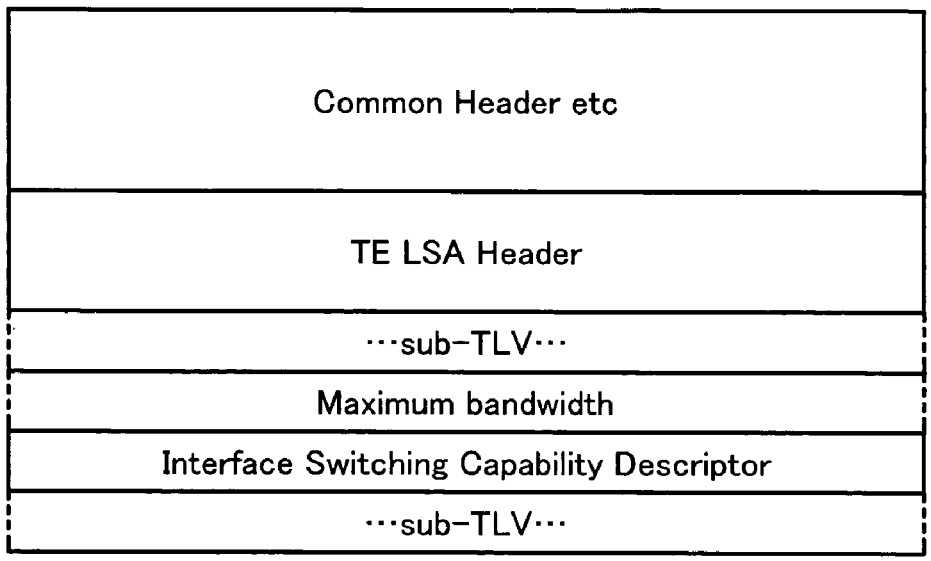
Maximum bandwidth
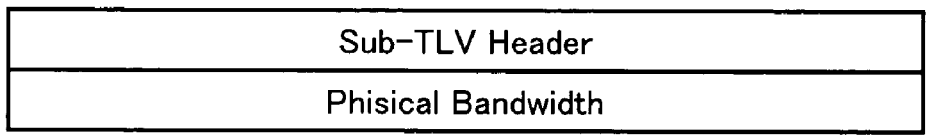
Interface Switching Capability Descriptor
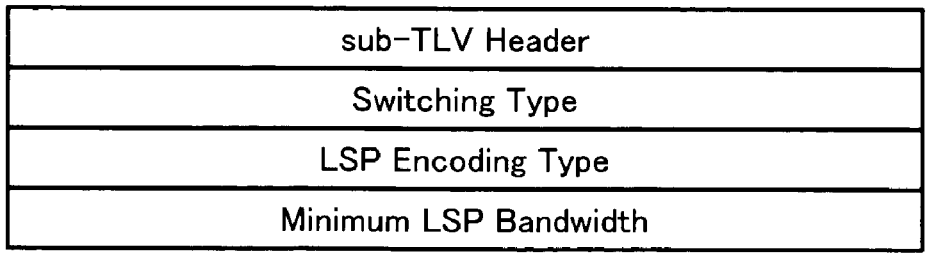
FIG. 8

| SUB-TLV NAME | FIELD NAME | SETTING |
|---|---|---|
| Maximum bandwidth | Phisical Bandwidth [Mbit/s] | 10,000 |
| Interface Switching Capability Descriptor | Switching Type | TDM |
| | LSP Encoding Type | SONET |
| | Minimum LSP Bandwidth [Mbit/s] | 50 (STS-1) |

FIG. 9

SETTINGS IN PATH MANAGEMENT TABLE T2
(WHEN NODE A STARTS PATH SETTING)

| FIELD NAME | SETTING |
|---|---|
| DESTINATION-NODE ID | 172.27.170.3(NODE C) |
| PATH STATE | 1: PATH BEING SPECIFIED |
| BUNDLED-PATH ID | 0 (SPECIFIED LATER) |
| INPUT PORT NUMBER | 0 (NONE) |
| OUTPUT PORT NUMBER | 0 (SPECIFIED LATER) |
| INPUT WAVELENGTH LABEL | 0 (SPECIFIED LATER) |
| OUTPUT WAVELENGTH LABEL | 0 (SPECIFIED LATER) |

PATH STATE: 1: PATH BEING SPECIFIED
2: PATH BEING RELEASED
3: COMMUNICATIONS
BEING PERFORMED

FIG. 14

BUNDLED-PATH ID = NODE ID + BUNDLE ID

SETTINGS IN BUNDLE MANAGEMENT TABLE T3
(WHEN NODE A STARTS PATH SETTING)

| FIELD NAME | SETTING |
| --- | --- |
| DESTINATION-NODE ID | 172.27.170.3(NODE A) |
| BUNDLE ID | 1 |
| WHETHER ROUTE INFORMATION IS ADVERTISED | 0 (ADVERTISED IMMEDIATELY) |
| TOTAL BANDWIDTH | 0 (NONE) |
| NUMBER OF COMPONENT LINKS | 0 (NONE) |
| COMPONENT-LINK PATH ID | 0 (NONE) |

WHETHER ROUTE INFORMATION IS ADVERTISED:
    0: ADVERTISED IMMEDIATELY
    1: NOT ADVERTISED IMMEDIATELY

FIG. 18

SETTINGS IN PATH MANAGEMENT TABLE T2
(WHEN NODE C SARTS PATH SETTING)

| FIELD NAME | SETTING |
|---|---|
| DESTINATION-NODE ID | 172.27.170.3(NODE C) |
| PATH STATE | 1: PATH BEING SPECIFIED |
| BUNDLED-PATH ID | 172.27.170.1 (NODE A) + 1 (BUNDLE ID) |
| INPUT PORT NUMBER | 2 |
| OUTPUT PORT NUMBER | 0 (NONE) |
| INPUT WAVELENGTH LABEL | 0 (SPECIFIED LATER) |
| OUTPUT WAVELENGTH LABEL | 0 (NONE) |

FIG. 24

SETTINGS IN BUNDLE MANAGEMENT TABLE T3
(WHEN NODE C STARTS PATH SETTING)

| FIELD NAME | SETTING |
|---|---|
| DESTINATION-NODE ID | 172.27.170.3(NODE C) |
| BUNDLE ID | 1 |
| WHETHER ROUTE INFORMATION IS ADVERTISED | 0 (ADVERTISED IMMEDIATELY) |
| TOTAL BANDWIDTH[Mbit/s] | 10,000 |
| NUMBER OF COMPONENT LINKS | 1 |
| COMPONENT-LINK PATH ID | 172.27.170.1 (NODE A) + (LSP_ID) |

FIG. 25

SETTINGS IN WAVELENGTH ROUTE INFORMATION
DATA BASE (NODE A)

| FIELD NAME | SETTING |
|---|---|
| TE LSA Stogage Buffer Address | MEMORY ADDRESS |
| Destination-Node ID | 172.27.170.1(NODE A) |
| Next HOP ID | 0 (NONE) |
| Metric | 0 (NONE) |
| Output Port Number | 0 (NONE) |

FIG. 29

TRANSFER SYSTEM

CROSS-REFERENCE TO RELATED APPLICATION

This application is a continuing application, filed under 35 U.S.C. 111(a), of International Application PCT/JP2002/010305, filed on Oct. 2, 2002, the contents of which are herein wholly incorporated by reference.

BACKGROUND OF THE INVENTION

1. Field of the Invention

The present invention relates to transfer systems, and particularly to a transfer system for applying transfer control to bundling which bundles a plurality of paths into one path.

2. Description of the Related Art

The amount of information handled in information communication networks has been exceedingly increased, and further advanced multimedia service is expected at a wider bandwidth. In such a situation, dense wavelength division multiplex (DWDM) has been developed as a high-traffic transfer technology.

DWDM multiplexes light beams having different wavelengths at a high density to transfer a plurality of signals by one optical fiber at the same time. For example, with the use of DWDM, several tens to several hundreds of wavelengths (wavelength paths) each having a transfer capacity of 10 Gbps can be multiplexed in one optical fiber.

In this case, it is possible that 192 time division multiplexing (TDM) paths each having a transfer capacity of 51.840 Mbps are multiplexed in one wavelength path, and several hundreds of multi-protocol label switching (MPLS) paths are multiplexed in one TDM path at synchronous transport signal (STS)-1.

FIG. 48 shows the concept of a multiplexed path structure. A plurality of wavelength paths are multiplexed in one optical fiber. In each wavelength path, 192 TDM paths each having a transfer capacity of 51.840 Mbps are multiplexed. In each TDM path, several hundreds of MPLS paths are multiplexed.

The figure also shows hierarchical multiplexing at layers. Cross-connect control is applied only to the MPLS paths at nodes A and G. Cross-connect control which includes interconversion between MPLS paths and TDM paths is performed at nodes B and F. Cross-connect control which includes interconversion between TDM paths and wavelength paths is performed at nodes C and E. Cross-connect control is applied only to the wavelength paths at a node D.

The system scales of information communication networks have been greatly extended together with an increase in subscriber-data traffic caused by the use of the Internet and other factors. Therefore, to perform efficient signaling and routing in networks, a technology called a generalized MPLS (GMPLS) has attracted attention these days, and has been standardized by Internet Engineering Task Force (IETF).

GMPLS applies signaling and routing to signals on optical networks. An optical signal is switched by identifying its wavelength and a routing path is determined for an optical signal without converting the optical signal to an electric signal in GMPLS whereas a label is attached to a packet and a routing path is specified in MPLS.

In network management, provision (including data inputs and operation settings) is conventionally performed for each node with the use of a transaction language-1 (TL-1) command (language specifications determined by the north-America GR standard) and others. In GMPLS signaling, however, provision can be specified in units of paths.

In GMPLS, the efficiency of maintenance and management in such network management is increased by applying an extended control protocol for a subscriber-data IP network to a carrier-side network to integrate path setting and maintenance with those of the IP network.

In MPLS, signaling and routing are implemented only at a packet layer. In GMPLS, signaling and routing are controlled at all layers, an optical-fiber layer, a wavelength layer, a TDM layer, and an IP layer. Therefore, route information should be advertised for all the layers.

To specify a wavelength path by signaling, each node should have route information which specifies physical connections between nodes by optical fibers. Therefore, all nodes need to advertise the route information of local-node physical links to the network. When such physical route information is advertised, physical paths are configured between nodes, and a wavelength path can be specified between nodes.

Further, to specify a TDM path by signaling, each node should have route information which specifies wavelength paths between nodes. Therefore, all nodes need to advertise the wavelength paths as logical links to the network. It is also necessary to have TDM-path route information when an MPLS path is specified.

When 20 optical fibers are connected to one node, for example, route information which specifies the connected destination nodes of the 20 physical links should be advertised. Also for adjacent nodes thereof, physical-link route information should be advertised. This is because only links which advertise routing protocol are recognized.

When each of the 20 optical fibers has 0.100 wavelength paths, for example, route information should be advertised for 2,000 logical links (=20 optical fibers×100 wavelength paths).

When one wavelength path has 100 TDM paths, for example, route information should be advertised for 200,000 logical links (2,000 wavelength paths×100 TDM paths). Route information to be advertised is increased as more layers are used, sharply increasing the load of the network.

To solve such a problem, IETF has been examining link bundling (IETF draft: draft-ietf-mpls-bundle-01.txt). In link bundling, control is made such that paths having the same destination are bundled into one path (bundled link) and advertised. Even when a transmission-side node and a receiving-side node have different paths at the middle, the paths can be bundled into one link in link bundling.

FIG. 49 shows the concept of link bundling. In the figure, a plurality of wavelength paths are bundled into one path (bundled link), and a plurality of TDM paths are bundled into one bundled link. Connection nodes are advertised that the paths are bundled into one bundled link.

Since there are several hundreds to several hundred thousands links in total in the optical-fiber, wavelength, TDM, and IP layers in GMPLS, control cannot be made if each route information is advertised as in a conventional router. An object of link bundling is to advertise paths having the same destination as one path to reduce the amount of information handled by routing protocol and to improve scalability.

There has been conventionally proposed a system for implementing communications independent of the signal transmission rate and the format by assigning service to each wavelength path in which a communication channel between points is allocated to the wavelength, as an optical-network technology which includes a bundling function. The system is disclosed, for example, in paragraphs [0020] to [0039] and FIG. 1 in Japanese Unexamined Patent Publication No. Hei-11-98077.

In the conventional link-bundling technology proposed by IETF, described above, the information of each component link which forms a bundled link should have been already advertised because a bundle is specified for links which have already existed. Therefore, until a bundled link is specified, each node needs to control route information related to all component links. In addition, after a bundled link is specified, the route information of component links needs to be deleted.

This imposes a load on each node, which means that the original object of link bundling has not been sufficiently achieved.

Further, conventionally, a bundle is manually specified and managed for links which have already existed, and the same bundle setting is required for the transmission-side node and the receiving-side node. Therefore, a human mistake may occur at setting operations, and maintenance needs a long time, generating a low efficiency in maintenance and management.

Furthermore, IETF does not explicitly determine whether a bundled link needs to be once released when a component link is added or deleted after the bundled link has been specified.

SUMMARY OF THE INVENTION

In view of the foregoing, it is an object of the present invention to provide a transfer system having an improved transfer quality by reducing the amount of route information and the number of times advertisements are performed and by improving maintenance and management efficiency in bundling transfer.

To accomplish the above object, according to the present invention, there is provided a transfer system for applying transfer control to bundling which bundles a plurality of paths into one path. This transfer system includes a transmission-side transfer apparatus and a receiving-side transfer apparatus. The transmission-side transfer apparatus includes a path setting section for specifying a path between nodes for the receiving-side transfer apparatus as a bundled link which can have a plurality of paths tied up, and a transmission-side route-information advertisement section for advertising route information in a network when recognizing that the path has been established. The receiving-side transfer apparatus includes a path recognition section for recognizing the path and setting the path as a bundled link, and a receiving-side route-information advertisement section for advertising the route information in the network when recognizing that the path has been established.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows the format of a Path message.
FIG. 5 shows setting information in a Path message.
FIG. 6 shows the format of an Resv message.
FIG. 7 shows setting information in an Resv message.
FIG. 8 shows the format of a TE LSA message.
FIG. 9 shows setting information in a TE LSA message.
FIG. 14 shows settings in the path management table obtained when a node A starts path setting.
FIG. 18 shows settings in the bundle management table obtained when the node A starts path setting.
FIG. 24 shows settings in the path management table obtained when a node C starts path setting.
FIG. 25 shows settings in the bundle management table obtained when the node C starts path setting.
FIG. 29 shows setting information in a TEDB (for a wavelength layer).

DESCRIPTION OF THE PREFERRED EMBODIMENTS

Figure 1:
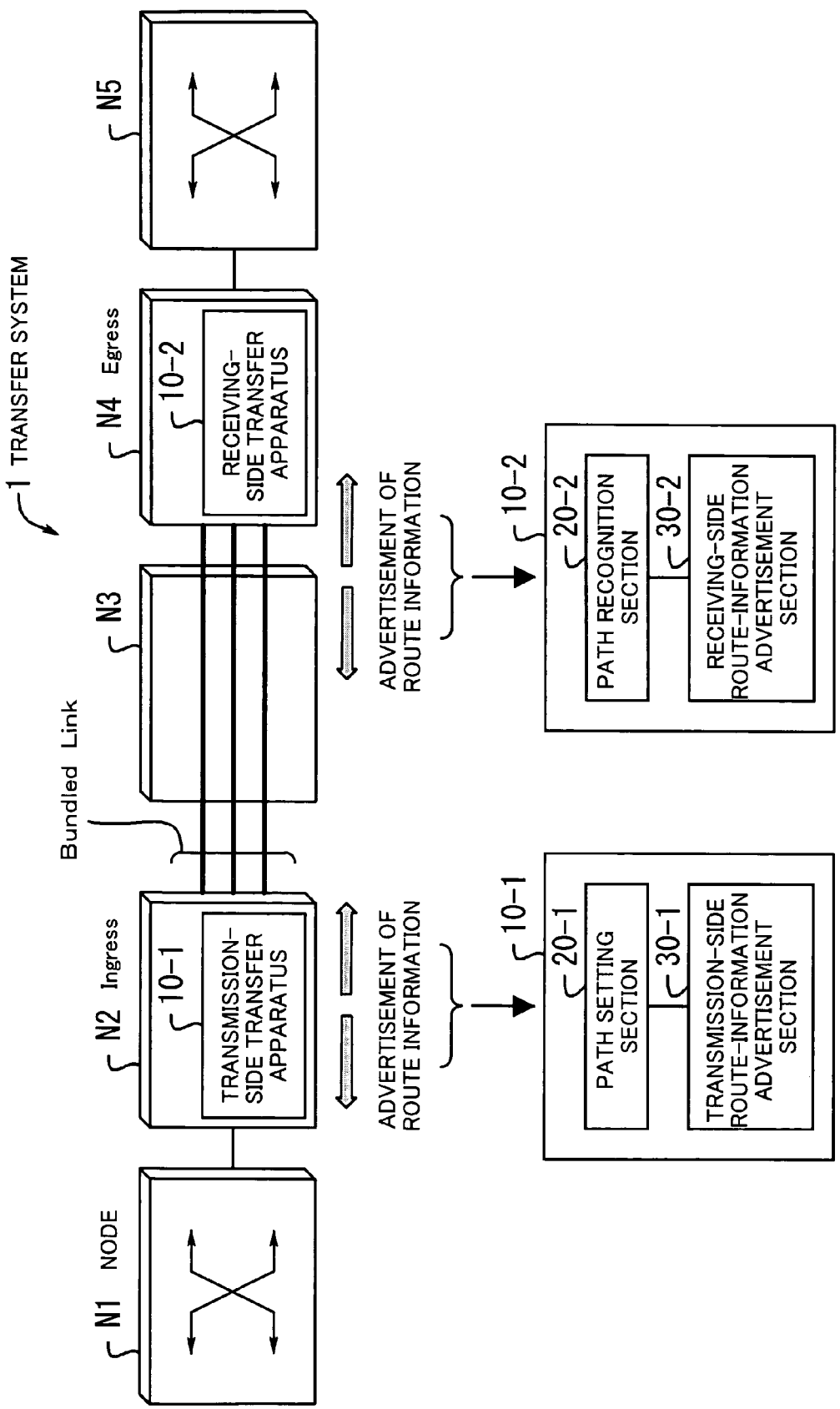
FIG. 1 shows a block diagram of a transfer system according to the present invention.

Embodiments of the present invention will be described below by referring to the drawings. FIG. 1 shows the concept of a transfer system 1 according to the present invention. The transfer system 1 includes a transmission-side transfer apparatus 10-1 and a receiving-side transfer apparatus 10-2, and applies transfer control to bundling which bundles a plurality of paths into one path.

In the figure, nodes N1 to N5 are connected in series. The node N2 serves as an inlet node (ingress) and has the transmission-side transfer apparatus 10-1. The node N4 serves as an outlet node (egress) and has the receiving-side transfer apparatus 10-2. A bundled link has been established between the node N2 and the node N4 via the node N3.

A bundled link refers to a single link which bundles paths having the same destination into one path. The functions of the transmission-side transfer apparatus 10-1 and the receiving-side transfer apparatus 10-2 according to the present invention are actually included in one transfer apparatus (node).

The transmission-side transfer apparatus 10-1 is formed of a path setting section 20-1 and a transmission-side route-information advertisement section 30-1. The path setting section 20-1 specifies a path between nodes for the receiving side as a bundled link which can have a plurality of paths bundled, in various networks such as an optical-fiber network, a TDM network, and an IP network.

In other words, in the present invention, a bundle setting (bundle-link setting) is automatically specified together with a path setting (conventionally, a bundle setting is specified for paths which have already been established). The bundle setting means control made when a plurality of paths are bundled to generate a bundled link.

The transmission-side route-information advertisement section 30-1 advertises route information to a network after path establishment is recognized. The route information refers to information related to traffic engineering, including a traffic load and a traffic type (specifically, it is a traffic engineering link state advertisement (TE LSA), and details thereof are described later).

The receiving-side transfer apparatus 10-2 is formed of a path recognition section 20-2 and a receiving-side route-information advertisement section 30-2. The path recognition section 20-2 recognizes the path specified by the transmission side, and sets it to a bundled link. The receiving-side route-information advertisement section 30-2 advertises route information to the network after path establishment is recognized.

When a first path to be set to a bundle link is specified, control is made such that path setting and a route-information advertisement are performed. When a path (component link) is added to the bundled link, control is made such that path setting and a route-information advertisement are performed assuming that the path is added to the bundled link. These pieces of control are automatically (autonomously) performed without any human intervention except a first command input by the administrator.

The component link refers to each link which forms a bundled link (for example, in FIG. 1, there are three component links in one bundled link).

An outline of GMPLS related to the present invention will be described next, and then details of the embodiments of the present invention will be described. When the GMPLS technology is used, route information which specifies physical connections between nodes by optical fibers is advertised by using routing protocol, path calculations are performed according to the route information, and a wavelength path to the target node is specified by using signaling protocol.

Route information which specifies the connection of the specified wavelength path between nodes is advertised by using the routing protocol, path calculations are performed according to the route information, and a TDM path to the target node is specified by using the signaling protocol.

In this way, the signaling protocol and the routing protocol are operated in all of the optical-fiber layer, the wavelength layer, the TDM layer, and the IP layer in GMPLS. A specific operation will be described below by using a process in which a wavelength path is specified in the wavelength layer, and the route information of the wavelength path is advertised in the TDM layer. In this case, it is assumed that the route information of the optical fiber, which is required to specify the wavelength path, has already been advertised in the network.

In this case, as the routing protocol of GMPLS, open shortest path first (OSPF) extension is used, which was extended for GMPLS from OSPF generally used in IP networks, and as the signaling protocol of GMPLS, resource reservation protocol traffic engineering (RSVP-TE) extension is used, which was extended for GMPLS from RSVP-TE generally used in IP networks.

Figure 2:
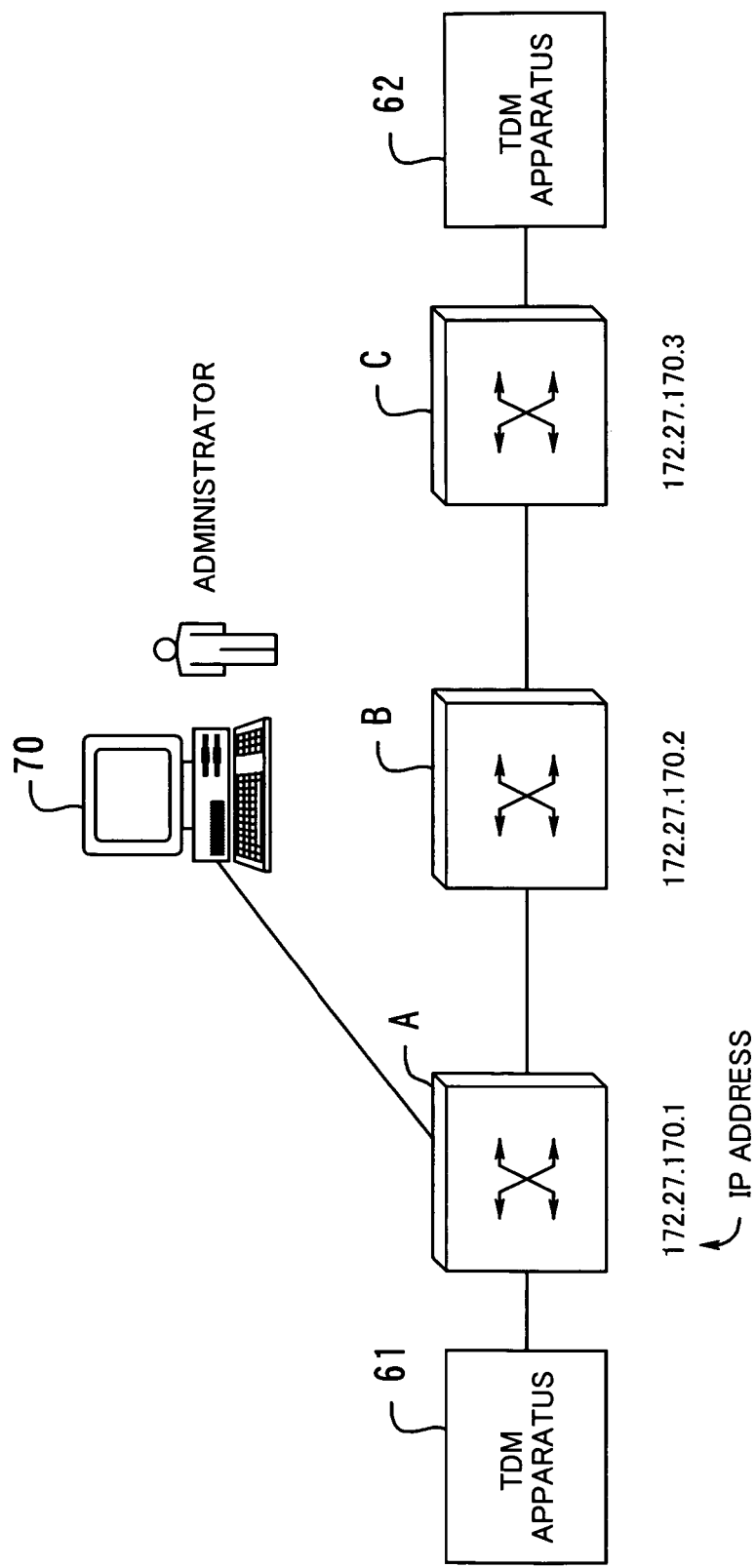
FIG. 2 shows an example network structure.

FIG. 2 shows an example network structure. Nodes A to C are connected in series. The node A is connected to a TDM apparatus 61 and a maintenance terminal 70. The node C is connected to a TDM apparatus 62. The nodes A to C perform optical cross-connect (OXC) control which cross connects optical wavelength signals without changing them to electric signals. The nodes A to C also have IP addresses serving as node IDs. A node ID is unique in a network.

Figure 3:
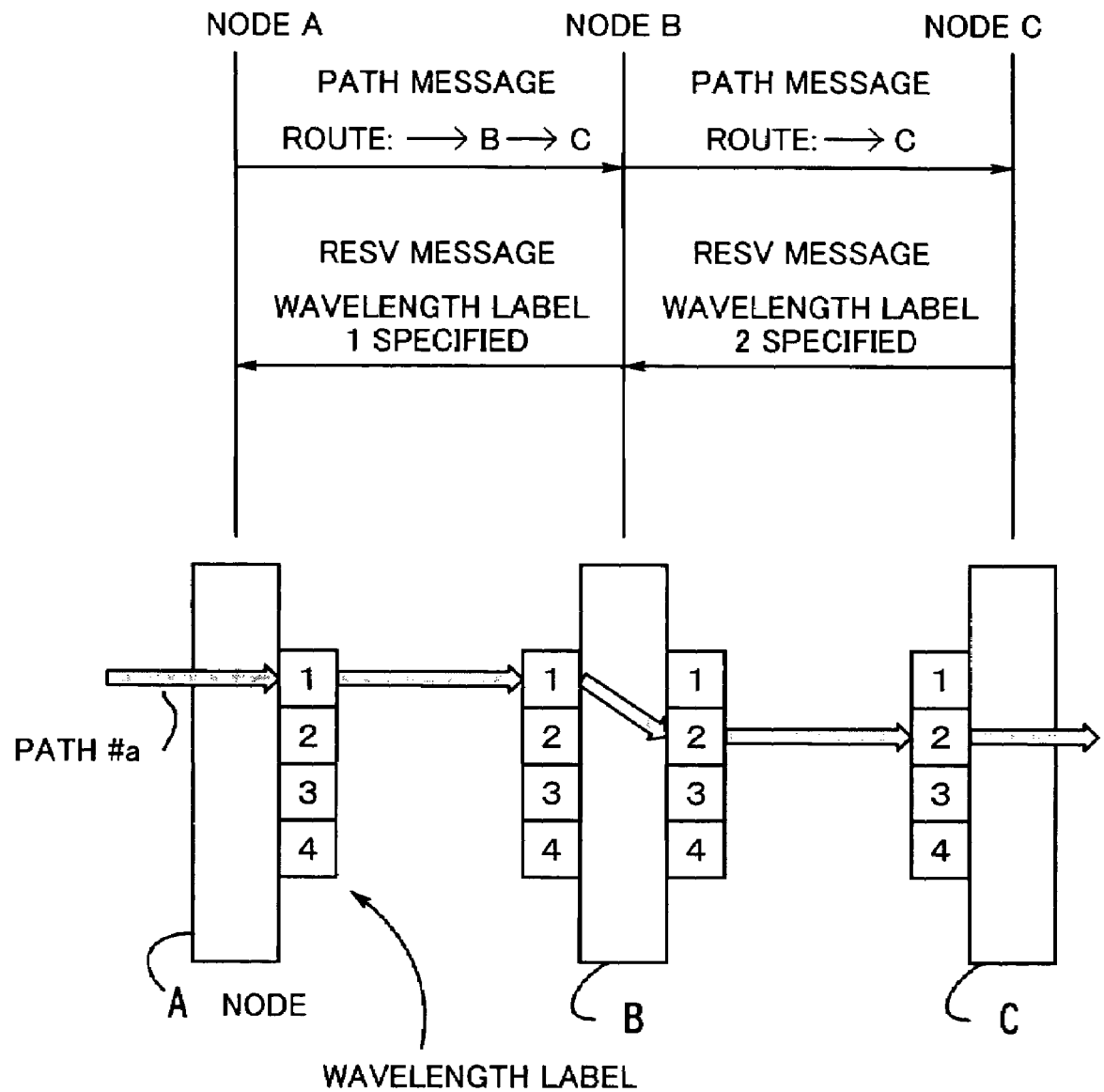
FIG. 3 shows wavelength-path setting with RSVP-TE extension.

FIG. 3 shows how a wavelength path is specified by RSVP-TE extension. To specify a path #a from the node A to the node C by GMPLS, the node A starts signaling to send a Path message to the target node, the node C.

FIG. 4 shows the format of the Path message. The Path message is formed of the fields of a common header and others, and the fields of various objects, such as a generalized label request object and an explicit route object.

FIG. 5 shows setting information in a Path message. According to the route (to the node C through the node B in the figure) specified in the explicit route object of the Path message, the Path message is sent to the node C while each node determines whether a resource can be obtained on the route. Then, a Resv message is sent back from the node C to the node A on the same route while a resource is obtained.

FIG. 6 shows the format of the Resv message. The Resv message is formed of the fields of a common header and others, and the fields of a generalized label object and others. The generalized label object is formed of the fields of an object header and a wavelength label.

FIG. 7 shows setting information in an Resv message. The settings in the Resv message sent from the node C are shown in the figure. When the node B receives the Resv message in which the node C has specified a wavelength label of 2, for example, the node B obtains an output path having a wavelength label of 2 to the node C according to the specified wavelength label. When the node B obtains an input path having a wavelength label of 1 to the node A, the node B specifies a cross-connect setting from the input path having a wavelength label of 1 to the output path having a wavelength label of 2.

Then, the node B places a wavelength label of 1 for the input path in a Resv message to be sent to the next node, which is the node A, and sends the message. The node A performs the same operations to specify a wavelength path between the node A and the node C.

How the route information of the specified wavelength path is advertised will be described next. The nodes C and A, which are at the ends of the wavelength path, advertise the route information of the wavelength path. Upon the transmission of the Resv message, the node C starts advertising the route information of the wavelength path. Upon the completion of the wavelength-path setting after the reception of the Resv message sent from the node B, the node A starts advertising the route information of the wavelength path.

The nodes A and C advertise traffic-engineering link state advertisement (TE LSA) as route information in the network. FIG. 8 shows the format of a TE LSA message. The TE LSA message is formed of the fields of a common header and others, the field of a TE-LSA header, and the fields of a sub type length value (TLV), the maximum bandwidth, and an interface switching capability descriptor.

The maximum bandwidth is formed of the fields of a sub-TLV header and a physical bandwidth. The interface switching capability descriptor is formed of the fields of a sub-TLV header, a switching type, an LSP encoding type, and the minimum LSP bandwidth.

FIG. 9 shows setting information in a TE LSA message. The TDM apparatuses 61 and 62 receive advertised TE LSA. The TDM apparatuses 61 and 62 recognizes that a link has been made between the node A and the node C when the apparatuses check a switching-type setting of TDM and an LSP-encoding-type setting of SONET in the received TE LSA. The physical bandwidth is set to 10 Gbps, and the minimum LSP bandwidth is set to STS-1.

Figure 10:
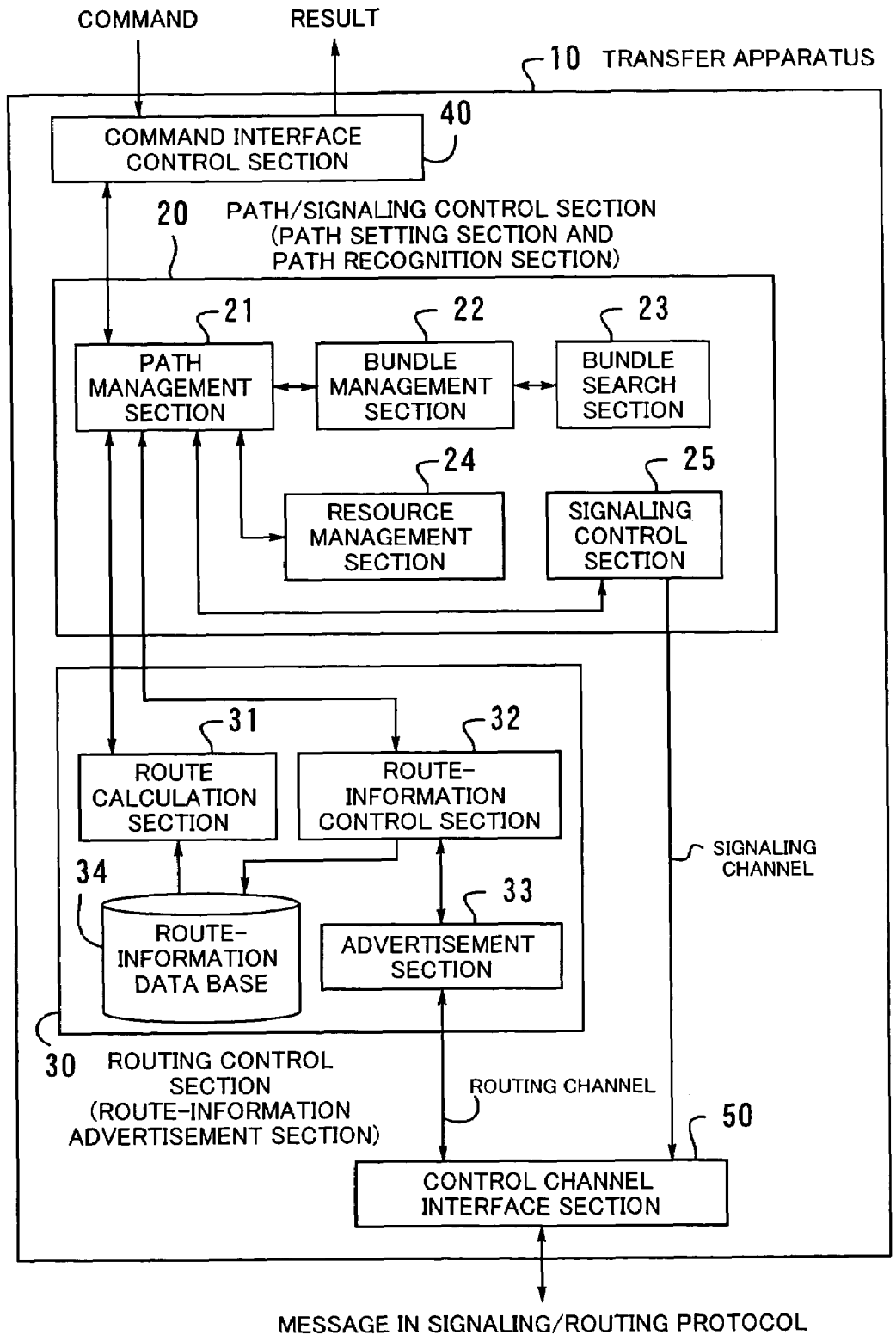
FIG. 10 shows the structure of a transfer apparatus according to the present invention.

The structure of a transfer apparatus according to the present invention will be described next. FIG. 10 shows the structure of the transfer apparatus 10. The transfer apparatus 10 includes a command interface control section 40, a path/signaling control section 20, a routing control section 30, and a control-channel interface section 50.

The path/signaling control section 20 includes a path management section 21, a bundle management section 22, a bundle search section 23, a resource management section 24, and a signaling control section 25. The routing control section 30 includes a route calculation section 31, a route-information control section 32, a route-information data base (DB) 34, and an advertisement section 33. The functions of the pass setting section and the path recognition section according to the present invention are included in the path/signaling control section 20, and the function of the route-information advertisement section according to the present invention is included in the routing control section 30.

The command interface control section 40 uses TL1 and simple network management protocol (SNMP) to receive commands from the administrator and to check the commands or to extract arguments used by other sections. The command interface control section 40 also sends the result of command processing to the administrator.

The path management section 21 performs pass setting processing and pass deletion processing, and manages a pass establishment state. In response to a path setting request caused by a command, or in response to the reception of a signaling message, the path management section 21 requests the bundle management section 22 to set a bundle. When path setting is completed, the path management section 21 requests the advertisement of route information, which is bundled-link information.

The bundle management section 22 bundles a plurality of paths (a plurality of component links) into a bundled link and controls the bundled link. Specifically, the bundle management section 22 adds or remove a component link to or from a bundled link, and manages the bandwidth obtained after the addition or removal of the component link. In addition, when the local node is a path-end node (transmission-side node) of a path to be specified, the bundle management section 22 determines whether to advertise route information.

The bundle search section 23 searches paths to be specified for those which can be bundled into a bundled link, by the destination address to extract those paths.

The resource management section 24 manages path resource information such as a used bandwidth and an available bandwidth. The resource management section 24 also specifies path setting or path removal to generate a signaling message and sends the message to another node (receiving-side node). The resource management section 24 further processes (extracts information from) a signaling message received from the another node. In the present invention, bundled-link information and whether route information is advertised are specified in a signaling message and sent.

The route calculation section 31 determines by calculations a route to the path destination according to the route information of the network. The route-information control section 32 manages the route information and controls advertisements. Specifically, the route calculation section 31 modifies the route-information DB 34 in response to a path generation, a path deletion, and a path modification (bandwidth change). In the present invention, the route information is managed not for individual paths but as the magnitude of the bandwidth of the bundled link. It is determined according to the advertisement specification whether the route information is advertised.

The advertisement section 33 terminates the routing protocol and advertises the route information. The advertisement section 33 also receives route information advertised by another node. The control-channel interface section 50 terminates a control channel between nodes, and transmits and receives messages in the signaling protocol and the routing protocol.

The operation of the present invention will be described in detail below. Control operations will be described in the flow of "initial bundled-link setting (immediate advertisement specified)", "the addition of a first component link (immediate advertisement specified)", "the addition of a second component link (not-immediate advertisement specified)", "the addition of a third component link (immediate advertisement specified)", and "the removal of a component link (immediate Advertisement specified).

To simplify the description, a case in which a unidirectional path is specified from the transmission-side node to the receiving-side node will be explained (the present invention can, of course, be applied to bi-directional paths).

In this case, OSPF extension is used as the routing protocol of GMPLS, and RSVP-TE extension is used as the signaling protocol of GMPLS. (It is possible that intermediate system intermediate system (IS-IS) extension is used as the routing protocol and constraint-based-routing label distribution protocol (CR-LDP) extension is used as the signaling protocol.) The operation achieved by each node when a first bundled link is autonomously specified between two nodes and the route information of the bundled link is advertised, in the "initial bundled-link setting (immediate advertisement specified)" phase will be described first.

Figure 11:
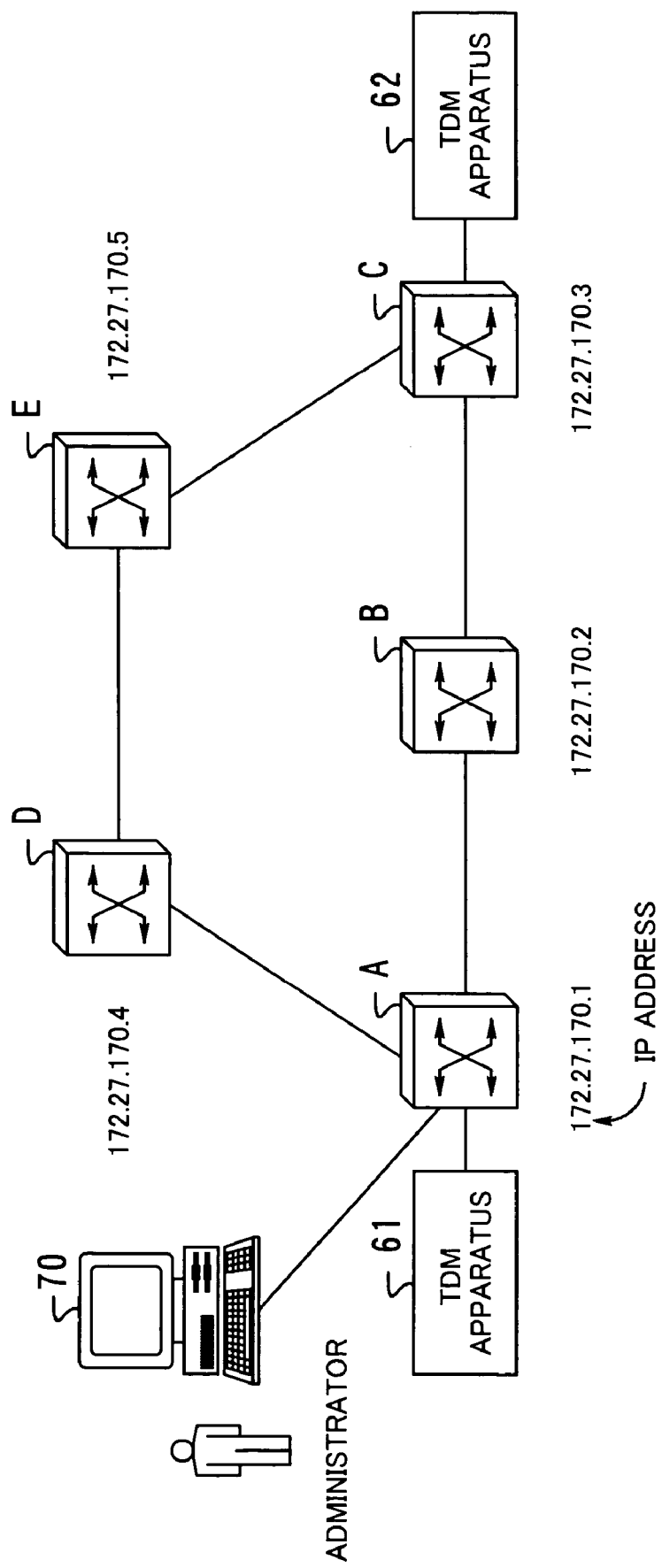
FIG. 11 shows a network structure.

FIG. 11 shows a network structure. Nodes A to E which perform optical cross-connect (OXC) control are connected in a ring-shaped manner as shown in the figure. The node A is connected to the TDM apparatus 61 and to the maintenance terminal 70. The node C is connected to the TDM apparatus 62. The nodes A to E have IP addresses unique in the network, which also serve as their node IDs.

The operation performed by the node A when it accepts a bundled-link path setting request from the administrator and starts signaling will be described first. It is assumed that the administrator specifies a wavelength path used as a bundled link from the node A (172.27.170.1) to the node C (172.27.170.3).

The bandwidth of the wavelength path is fixed to 10 Gbps, and the administrator specifies parameters at the path request. These parameters specify that the destination node ID be the node C (172.27.170.3), the requested path be to be bundled, and route information be automatically advertised after the path is established.

The command interface control section 40 of the node A sends the bundled-link path setting request received from the administrator to the path management section 21. The path management section 21 obtains a label-switched-path (LSP)_ID necessary for path management. The LSP_ID is assigned by the transmission-side node and is a value unique in the node.

Figure 12:
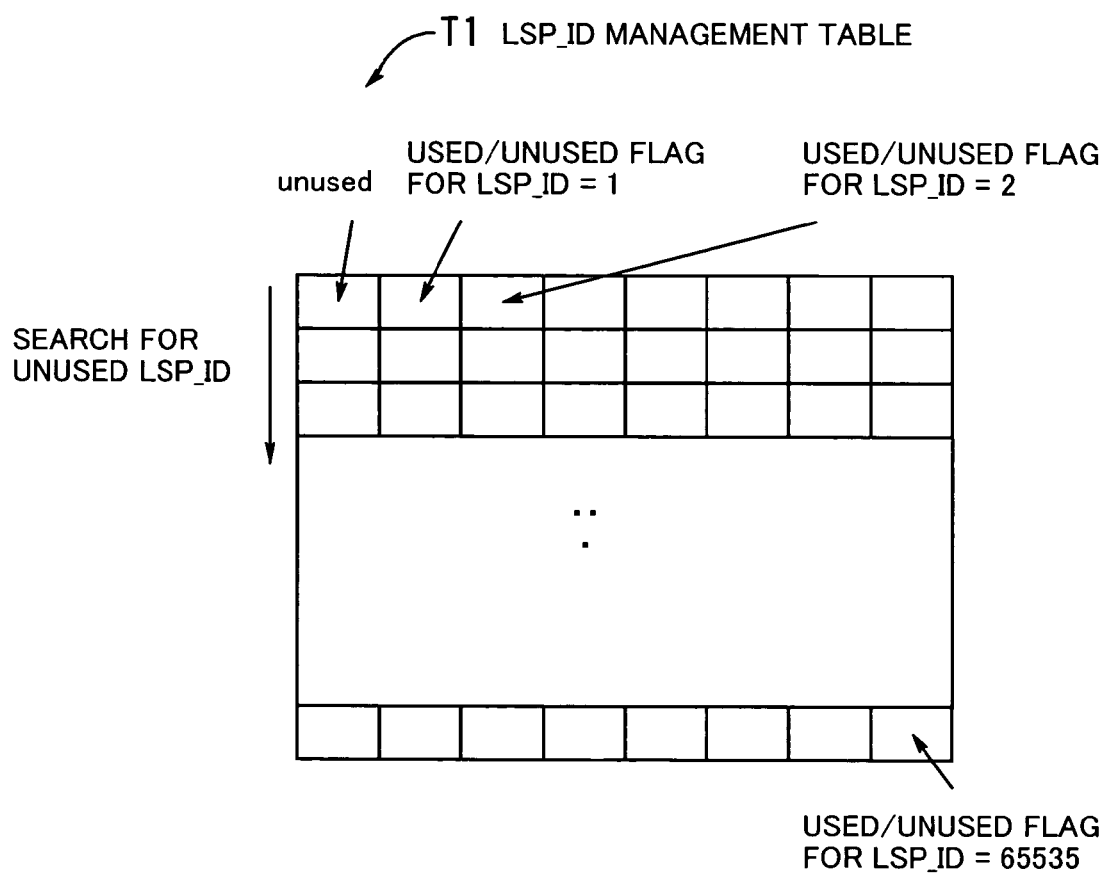
FIG. 12 shows an LSP_ID management table.

FIG. 12 shows an LSP_ID management table T1. The LSP_ID management table T1 is included in the path management control section 21, and is formed of flags each of which indicates that the corresponding LSP_ID is currently being used or is not used. The path management section 21 searches the LSP_ID management table T1 to obtain an LSP_ID not used.

The path management section 21 adds the obtained LSP_ID to the local node ID (node A (172.27.170.1)) to generate a path ID, and specifies various pieces of information for the requested path according to the path ID. The path ID is a path identification specified by signaling, is equal to the transmission-side node ID plus LSP_ID, and is unique in the network.

Figure 13:
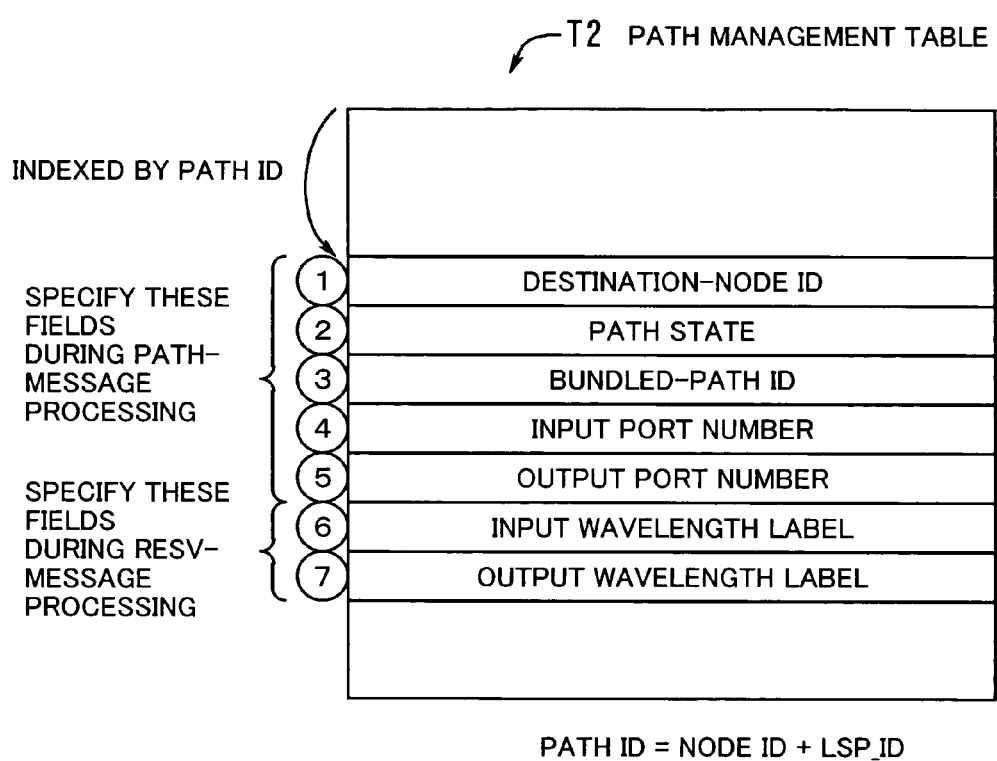
FIG. 13 shows a path management table.

FIG. 13 shows a path management table T2. The path management table T2 is included in the path management section 21, and has the fields of a destination-node ID, a path state, a bundled-path ID, an input port number, an output port number, an input wavelength label, and an output wavelength label, for the information of one path. (Encircled numbers in the figure are used for easy understanding in the later description of flowcharts shown in FIG. 36 and later.)

The path management section 21 indexes the path management table T2 by the path ID to specify values in the corresponding fields. The destination node ID to the output port number are specified when the Path message is processed (during transmission-data processing), and the input wavelength label and the output wavelength label are specified when the Resv message is processed (during receiving-data processing).

FIG. 14 shows settings in the path management table T2 obtained when the node A starts path setting. At this point of time, the destination-node-ID field is set to 172.27.170.3 (node C), the path-state field is set to "1", and the bundled-path ID field to the output-wavelength-label field are set to "0" in the path management table T2. In the path-state field, "1" indicates that the path is being set, "2" indicates that the path is being released, and "3" indicates that communications are being performed.

In the bundled-path ID field to the output-wavelength-label field, "0" indicates that the fields are set later. In the input-port-number field, "0" indicates that the input port is not used (because the path is specified from the node A to the node C).

Next, the path management section 21 requests the bundle management section 22 to obtain a bundle ID used for bundled-link path management. (Conventionally, route determination processing was performed at this point.) The bundle ID is assigned by the transmission-side node and is unique in the node.

When the bundle management section 22 receives a request for obtaining a bundle ID from the path management section 21, the bundle management section 22 asks the bundle search section 23 to search paths for those to be bundled. To search paths for those to be bundled means to determine whether a bundled link exists between the node A and the node C. The bundle search section 23 searches paths for those to be bundled by using the destination-node ID input by the administrator.

Figure 15:
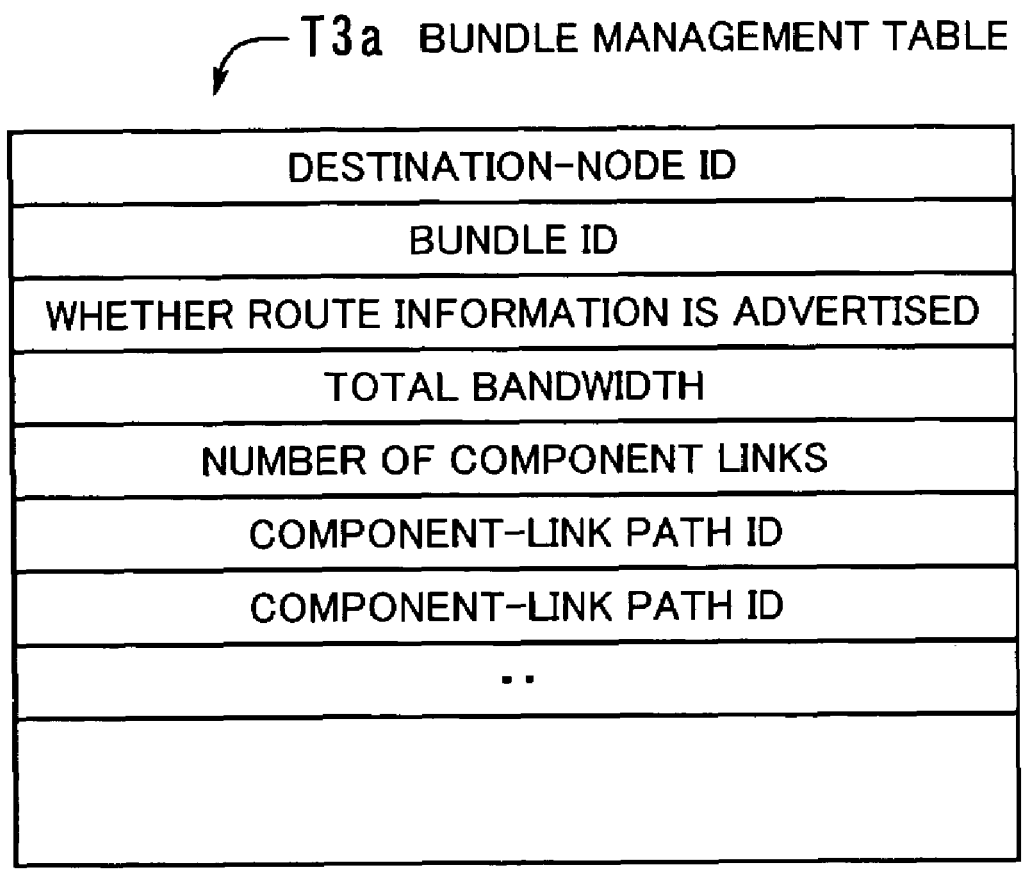
FIG. 15 shows a bundle management table.

FIG. 15 shows a bundle management table T3a. The bundle management table T3a is included in the bundle management section 22, and is formed of the fields of a destination-node ID, a bundle ID, whether route information is advertised, a total bandwidth, the number of component links, and the path IDs of component links, for the information of one path.

The bundle search section 23 searches the bundle management table T3a for the destination-node ID reported from the administrator. At this stage, since the first path setting is currently being performed, all fields are vacant. Therefore, the bundle search section 23 reports to the bundle management section 22 that there is no path to be bundled (in other words, a first bundled link will be specified).

Figure 16:
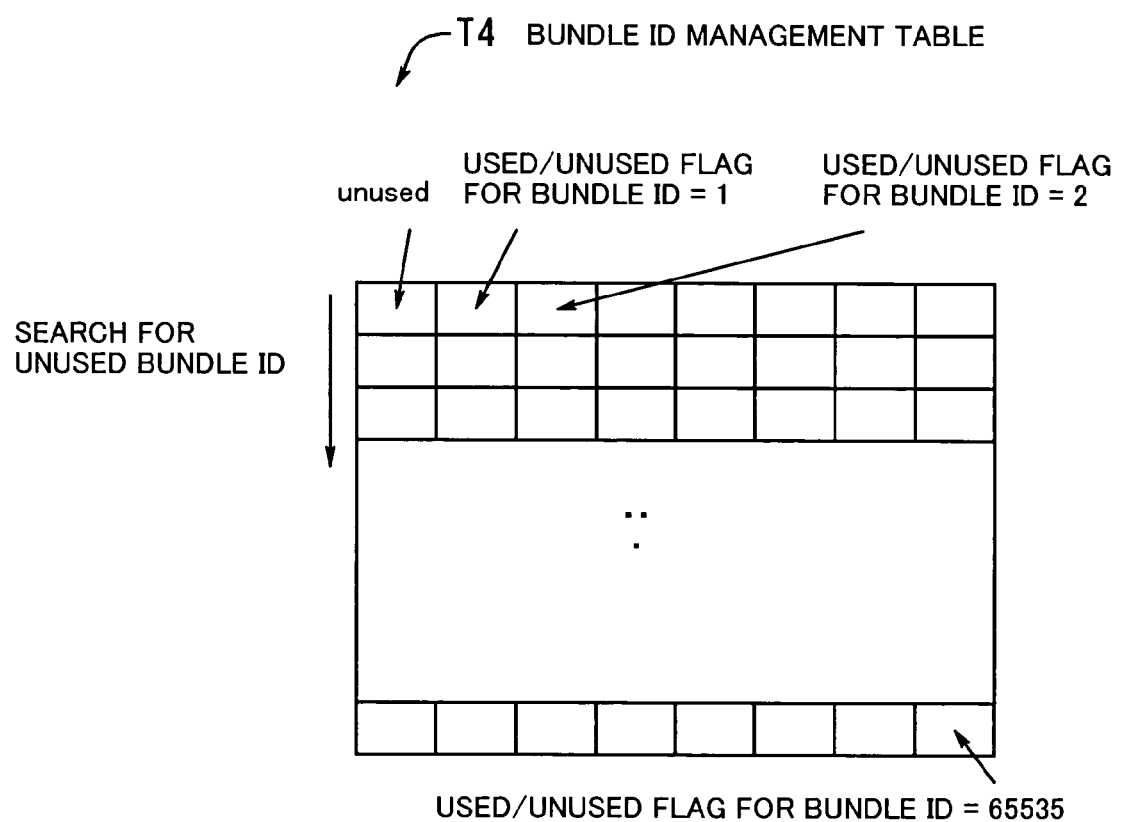
FIG. 16 shows a bundle-ID management table.

The bundle management section 22 recognizes the above-described result, and then, performs bundle-ID acquisition processing. FIG. 16 shows a bundle-ID management table T4. The bundle-ID management table T4 is included in the bundle management section 22, and is formed of flags each of which indicates that the corresponding bundle ID is currently being used or is available. The bundle management section 22 searches the bundle-ID management table T4 to obtain an unused bundle ID (it is assumed here that a bundle ID of 1 is obtained).

Then, the bundle management section 22 adds the obtained bundle ID (1) to the own node ID (172.27.170.1 for the node A) to generate a bundled-path ID, and sends the bundled-path ID to the path management section 21. The bundled-path ID indicates an identifier which indicates a single link made by bundling a plurality of paths, is equal to the transmission-side node ID plus the bundle ID, and is unique in the network.

Figure 17:
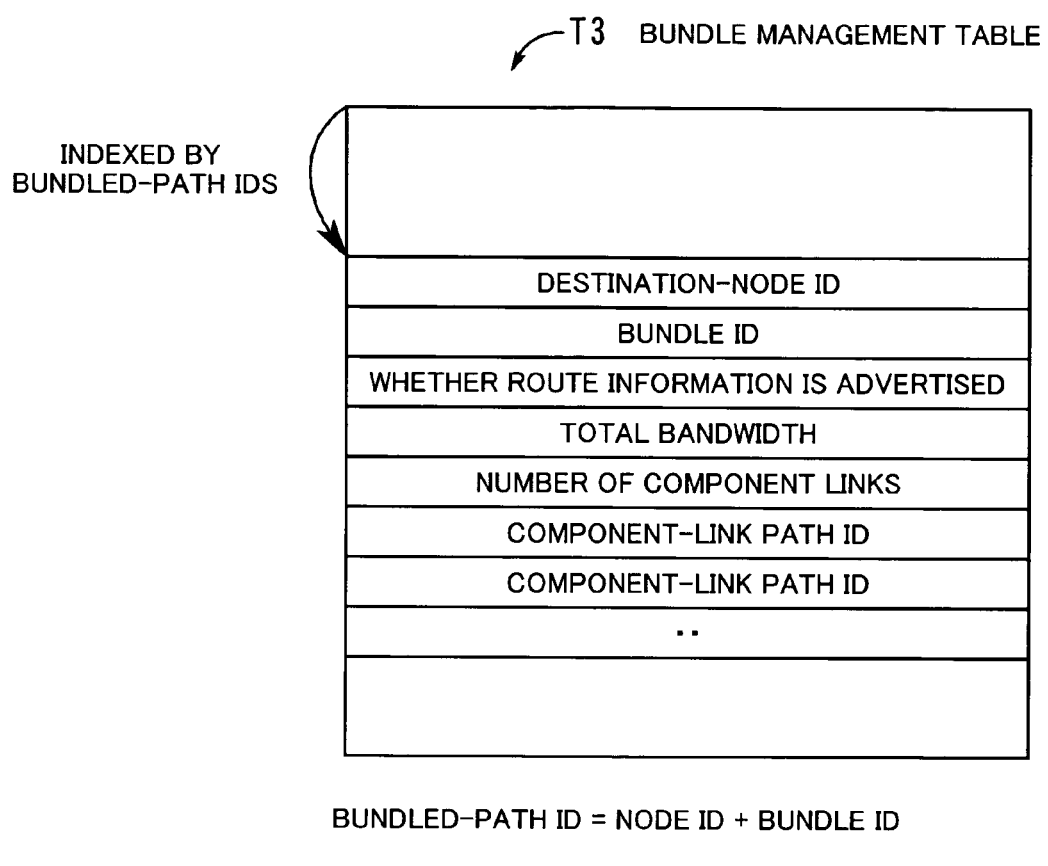
FIG. 17 shows a bundle management table.

FIG. 17 shows a bundle management table T3. The table is indexed by bundled-path IDs. FIG. 18 shows settings in the bundle management table T3, obtained when the node A starts setting a path. At this point of time, the destination-node-ID field is set to 172.27.170.3 (node C), the bundle-ID field is set to "1", and the whether-route-information-is-advertised field to the component-link-path-ID field are set to "0".

When the whether-route-information-is-advertised field is set to "0", it means that the route information is immediately advertised (when the field is set to "1", it means that the route information is not immediately advertised"). When the total-bandwidth field to the component-link-path-ID field are set to "0", it means that the fields has no value. The component-link path ID equals the path ID.

The path management section 21 specifies the received bundled-path ID in the path management table T2 shown in FIG. 13, and then, requests the route calculation section 31 to determine the path route. The route may be determined according to the Dijkstra algorithm, which is used in OSPF as shortest-route search algorithm. It is assumed here that the route from the node A to the node C through the node B is determined.

Figure 19:
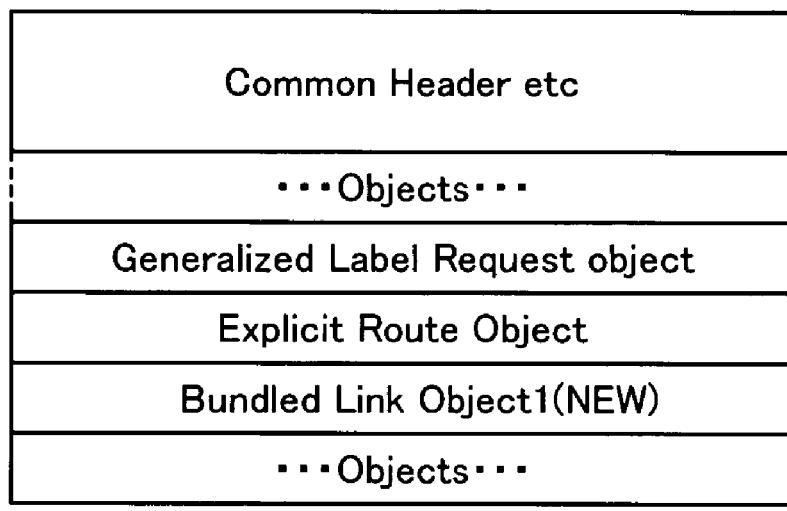
FIG. 19 shows the format of a Path message.
Figure 20:
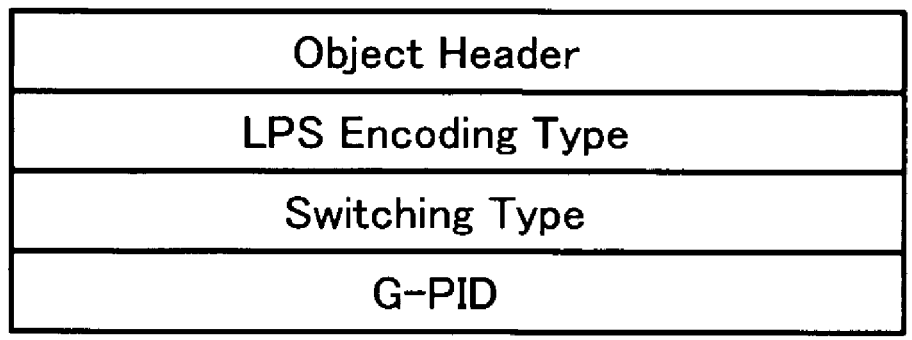
FIG. 20 shows the format of a generalized label request object.
Figure 21:
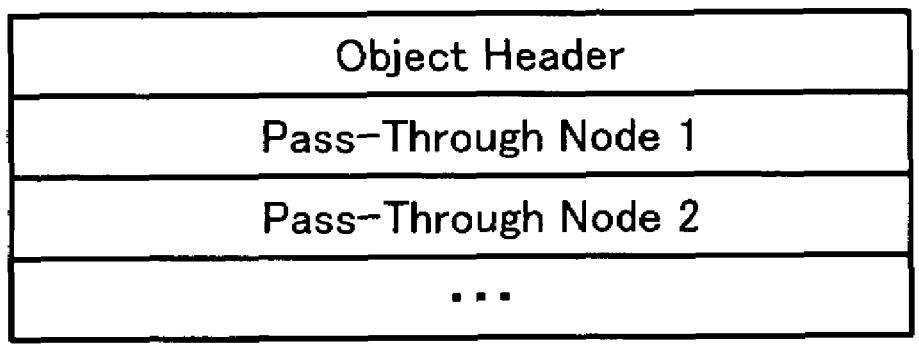
FIG. 21 shows the format of an explicit route object.

Then, the path management section 21 requests the signaling control section 25 to send a Path message. FIG. 19 shows the format of the Path message. The Path message is formed of the field of a common header and others, and the fields of various objects, such as a generalized label request object, an explicit route object, and a bundled link object. The bundled link object is added newly in the present invention. FIG. 20 and FIG. 21 show the formats of the generalized label request object and the explicit route object, respectively. The generalized label request object is formed of the fields of an object header, an LPS encoding type, a switching type, and G-PID. The explicit route object is formed of the fields of an object header and pass-through-node information.

Figure 22:
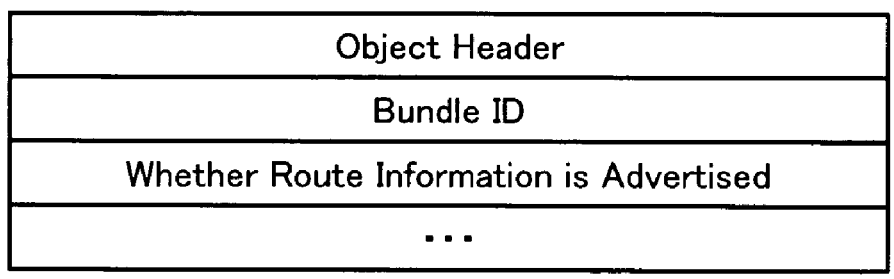
FIG. 22 shows the format of a bundled link object.

FIG. 22 shows the format of the bundled link object. The bundled link object is formed of the fields of an object header and the setting information (the bundle ID, whether route information is advertised, the total bandwidth, the number of component links, and the component-link path IDs) of the bundle management table T3.

The signaling control section 25 edits the Path message to which the bundled link object has been added in the present invention. The control-channel interface section 50 sends the edited Path message to the adjacent node, the node B.

Figure 23:
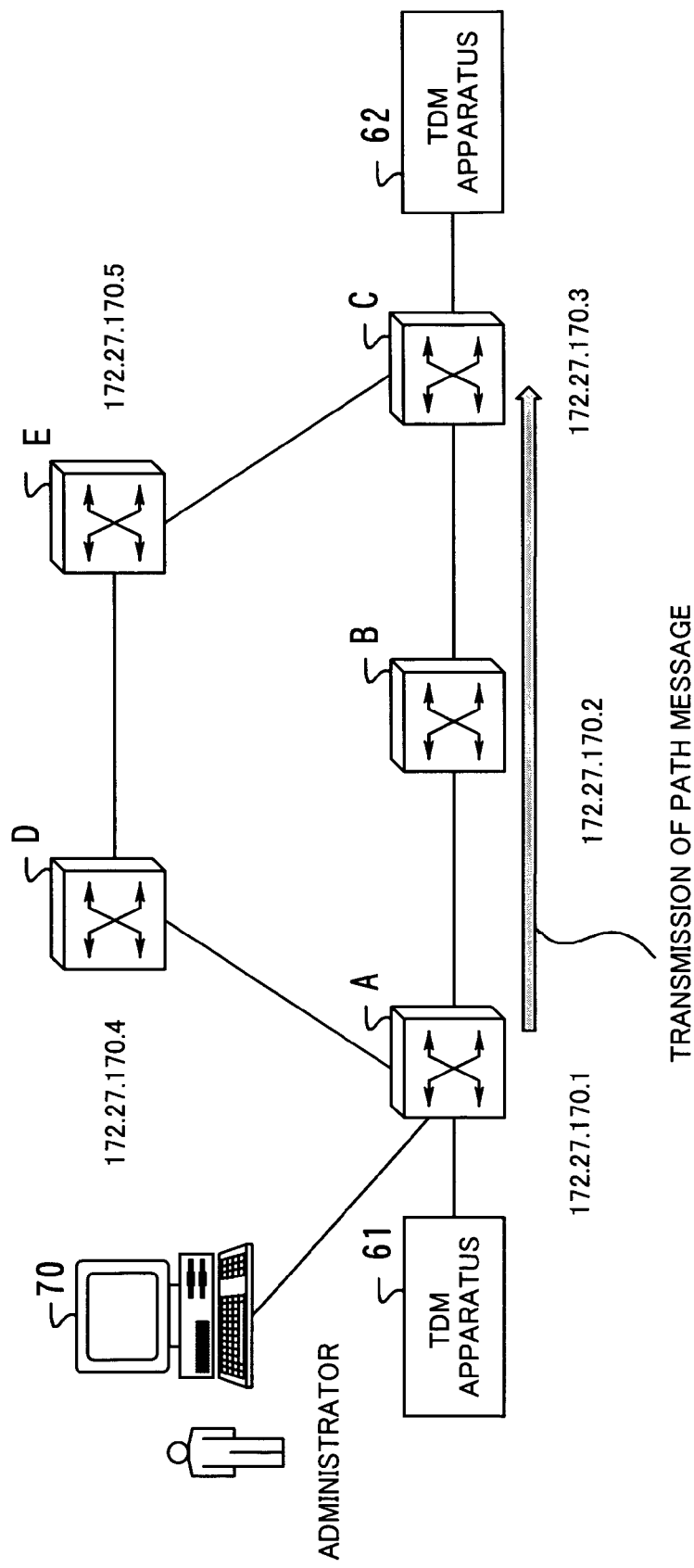
FIG. 23 shows the transmission of a Path message for an initial path.

The Path message sent from the node A reaches the destination node, the node C, through the node B. FIG. 23 shows the first Path message transmission. The system configuration is the same as in FIG. 11.

Since the node B, serving as a relay node, just transfers the Path message to which the bundled link object has been added, in a transparent manner, and performs other operations which are the same as in known processing, a description thereof is omitted.

The control-channel interface section 50 of the node C, which is the receiving-side node, sends the received Path message to the signaling control section 25, and the signaling control section 25 sends the Path message to the path management section 21. The path management section 21 obtains an available LSP_ID as in the transmission-side node, and sets the path management table T2 according to the received Path message.

FIG. 24 shows settings in the path management table T2 specified when the node C starts setting a path. At this point of time, the destination-node-ID field is set to 172.27.170.3 (node C), the path-state field is set to "1", the bundled-path-ID field is set to 172.27.170.1 (node A)+1 (bundle ID), the input-port-number field is set to "2", and the output-port-number-field to the output-wavelength-label field are set to "0".

Then, the path management section 21 requests the bundle management section 22 to perform the final bundle setting. The bundle management section 22 searches the bundle management table T3 shown in FIG. 15 by using the bundled-path ID (172.27.170.1 (node A)+1 (bundle ID)) reported from the path management section 21 to extract the destination node.

In this case, since the destination node has not yet been specified, the bundle management section 22 recognizes that this operation is the first bundled-link setting, specifies values in the bundle management table T3 as shown in FIG. 25, and returns control to the path management section 21.

FIG. 25 shows settings in the bundle management table specified when the node C starts setting a path. The destination-node-ID field is set to 172.27.170.3 (node C), the bundle-ID field is set to "1", the whether-route-information-is-advertised field is set to "0", the total-bandwidth field is set to "10000", and the number-of-component-links field is set to "1", and the component-link-path-ID field is set to 172.27.170.1 (node A) plus LSP_ID.

The path management section 21 requests the resource management section 24 to assign a wavelength label, specifies the assigned wavelength label (=2) in the path management table T2, and sets the path state to "communications being performed". Then, the path management section 21 requests the signaling control section 25 to send an Resv message.

The signaling control section 25 edits an Resv message, and the control-channel interface section 50 sends the Resv message. Since the Resv message has the same format as a conventional Resv message, a description thereof is omitted.

Figure 26:
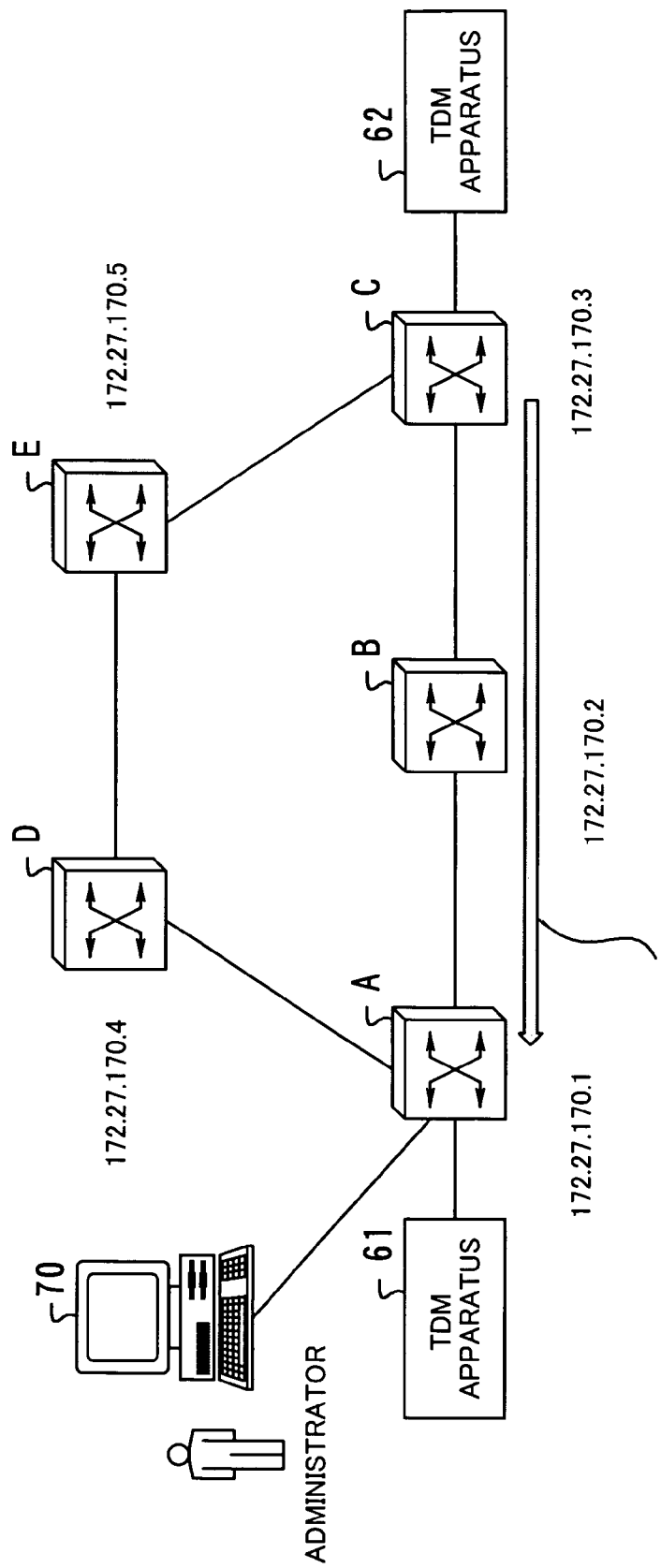
FIG. 26 shows the transmission of an Resv message for the initial path.

The Resv message transmitted from the node C in this way reaches the node A, which is the transmission-side node, through the node B. FIG. 26 shows the transmission of the Resv message for the initial path. The system configuration is the same as in FIG. 11.

When the node A, which is the transmission-side node, receives the Resv message, the Resv message is sent to the path management section 21 through the control-channel interface section 50 and the signaling control section 25.

The path management section 21 specifies the wavelength label included in the received Resv message in the output-wavelength-label field of the path management table T2, and also requests the bundle management section 22 to specify a bundle. The bundle management section 22 specifies the bundle management table T3 (more specifically, specifies the total bandwidth, the number of component links, and the component-link path IDs) in the same way as in the operation of the node C, and returns control to the path management section 21.

The path management section 21 sets the path-state filed to "communication being performed" in the path management table T2. The path management section 21 sends the bundled-link route information to the route-information control section 32, and also reports the completion of the bundled-link setting to the command interface control section 40.

The command interface control section 40 reports the completion of the bundled-link setting to the administrator, and the administrator recognizes the completion of the bundled-link setting. As described above, the bundled-link path can be set synchronously at the transmission-side and the receiving-side nodes.

The route-information control section 32 of the node A, which is the transmission node, has received the bundled-link route information from the path management section 21. The route-information control section 32 needs to store the route information in the route-information DB 34 and manage it. The way the route information is managed will be described below, and then processing in the route-information control section 32 will be described.

Nodes which use the GMPLS technology need to manage the route information of layers, such as an optical-fiber layer and a wavelength-path layer. Therefore, nodes which handle a plurality of layers need to manage the information of each layer.

Figure 27:
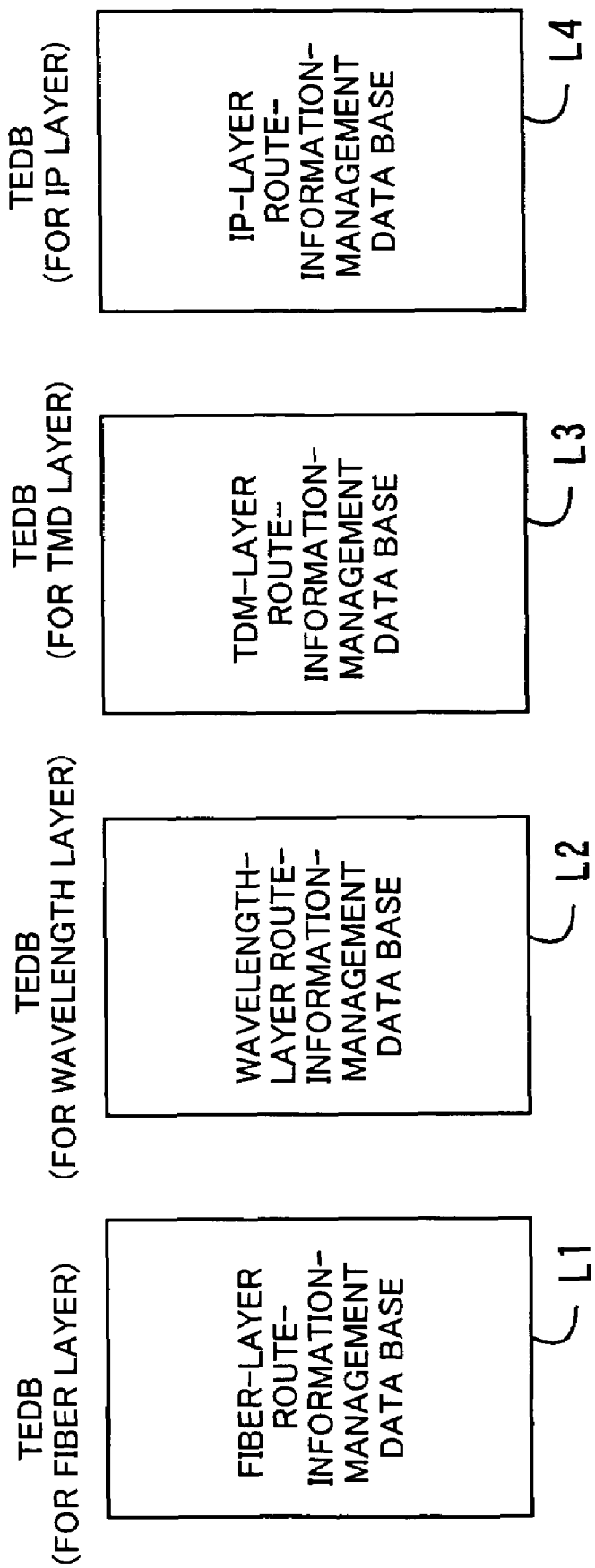
FIG. 27 shows the management format of a route-information data base.

FIG. 27 shows the management format of the route-information DB 34. As shown in the figure, route information L1 to L4 is stored and managed in a layer basis for the optical-fiber layer, the wavelength-path layer, the TDM layer, and the IP layer.

In OSPF routing protocol, the route information L1 to L4 is advertised with the use of TE LSA. The data base which accumulates the route information is hereinafter called a traffic engineering data base (TEDB).

The route-information control section 32 will be described next. The route-information control section 32 receives the bundled-link route information from the path management section 21 of the node A, and then, the route-information control section 32 determines from the received route information that the data base to be controlled is that for the wavelength layer.

Then, the route-information control section 32 searches the TEDB (for the wavelength layer) L2 for a TE LSA to be hand-led, by the node ID included in the route information. In this case, since no TE LSA to be handled exists in the initial wavelength path, the route-information control section 32 generates a TE LSA according to the route information, and links the generated TE LSA to the TEDB (for the wavelength layer) L2. FIG. 8 and FIG. 9 show the TE LSA generated at this time.

Figure 28:
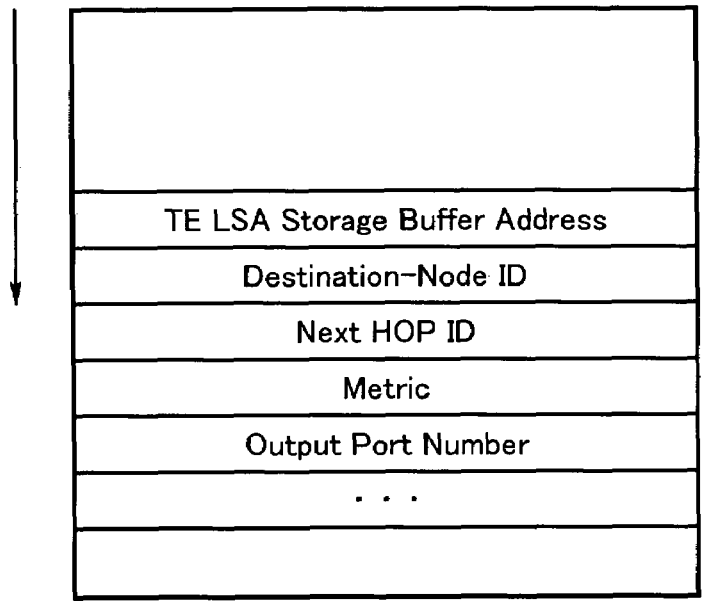
FIG. 28 shows a wavelength route-information data base.

Next, the route-information control section 32 performs route calculations by the Dijkstra algorithm and specifies the route in the TEDB (for the wavelength layer) L2. In this case, since the generated TE LSA is for the local node, there is little setting information for the TEDB (for the wavelength layer) L2, and the information is shown in FIG. 28 and FIG. 29. FIG. 28 shows a wavelength route information data base, and FIG. 29 shows setting information in the TEDB (for the wavelength layer).

The wavelength route information data base is formed of the fields of a TE LSA storage buffer address, a destination-node ID, the next HOP ID, a metric, an output port number, and others. In the wavelength route information data base for the node A, the TE LSA storage buffer address is set to a memory address, the destination-node ID is set to the ID (172.27.170.1) of the node A, the next HOP ID is set to "0", the metric is set to "0", and the output port number is set to "0".

The route-information control section 32 determines whether the TE LSA is immediately advertised. In this case, since "immediately advertised" is specified, the route-information control section 32 requests the advertisement section 33 to advertise the generated TE LSA. The advertisement section 33 advertises the TE LSA through the control-channel interface section 50 according to the request. The format of the TE LSA to be advertised is the same as that shown in FIG. 8 and FIG. 9.

Figure 30:
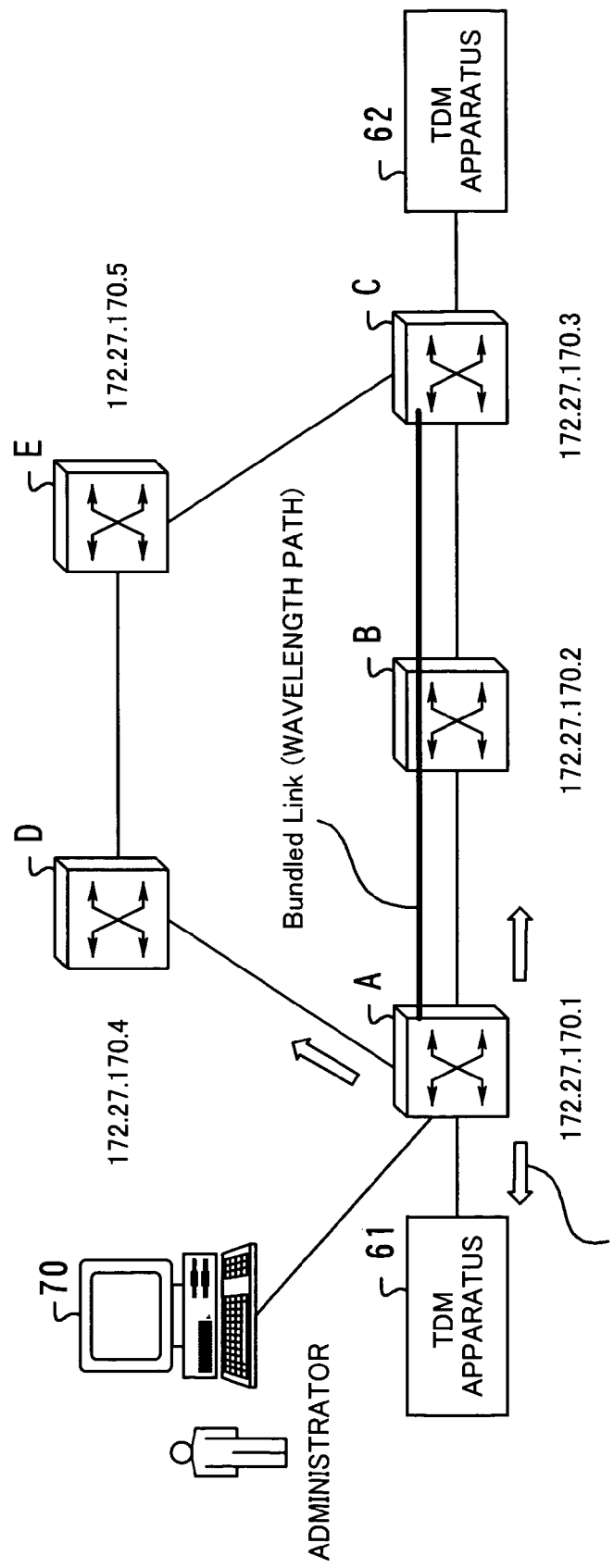
FIG. 30 shows a route-information advertisement.

The TE LSA advertised by the node A reaches the whole part of the network. FIG. 30 shows route-information advertisement. As shown in the figure, when the TDM apparatuses 61 and 62 recognizes that a wavelength path of 10 Gbps has been specified between the node A and the node C, a SONET path can be specified between the TDM apparatus 61 and the apparatus 62 to advertise the TE LSA to the whole part of the network.

As described above, the transmission-side node and the receiving-side node can automatically specify a bundled-link path and advertise route information after the establishment of the bundled-link path is recognized.

Next, "the addition of a first component link (immediate advertisement specified)" will be described. After the "initial bundled-link setting (immediate advertisement specified)", already described, the operation of each node in a case in which a component-link-setting request is received from an administrator shown in FIG. 30 will be described.

It is assumed that the administrator specifies a component link (wavelength path) to be added to the bundled link, from the node A (172.27.170.1) to the node C (172.27.170.3). It is also assumed that the bandwidth of the wavelength path is fixed to 10 Gbps, and the administrator specifies in parameters at the path request that a destination-node ID is 172.27.170.3 (node C), the path is to be bundled, and route information is automatically advertised after the wavelength path is established.

It is possible to automatically determine a bundled link to be bundled even if a bundled link to which a component link is to be added is not explicitly specified. This issue will also be described together.

In the same way as in the "initial bundled-link setting (immediate advertisement specified)", when the administrator inputs a component-link setting request to the node A, the processing flow reaches the bundle search section 23 through the command interface control section 40, the path management section 21, and the bundle management section 22. Since the operations thereof has already been described above, no description is made. It is assumed that the path management section 21 obtains an LSP_ID of 2.

The bundle search section 23 searches the bundle management table T3 shown in FIG. 17 for a path to be bundled, according to the ID (172.27.170.3) of the node C, the destination node, input by the administrator.

In this case, since the bundled link has already been registered, a path to be bundled has already existed. The extracted bundled-path ID (172.27.170.1 (ID of node A)+1 (bundle ID)) of the path to be bundled is reported to the bundle management section 22 to automatically determine the path to be bundled.

The bundle management section 22 reports the extracted bundled-path. ID to the path management section 21. The path management section 21 requests a route calculation and Path message transmission, and the signaling control section 25 edits the Path message (since the processing has already be described, no description is made here).

In the component-link route calculation, when the component link and the bundled link which has already been specified have the same receiving-side node, even if they differ in route, the component link can be specified as a path to be bundled without any problem. For simplicity of description, it is assumed that the same route as the bundled link, from the node B to the node C, is selected.

Figure 31:
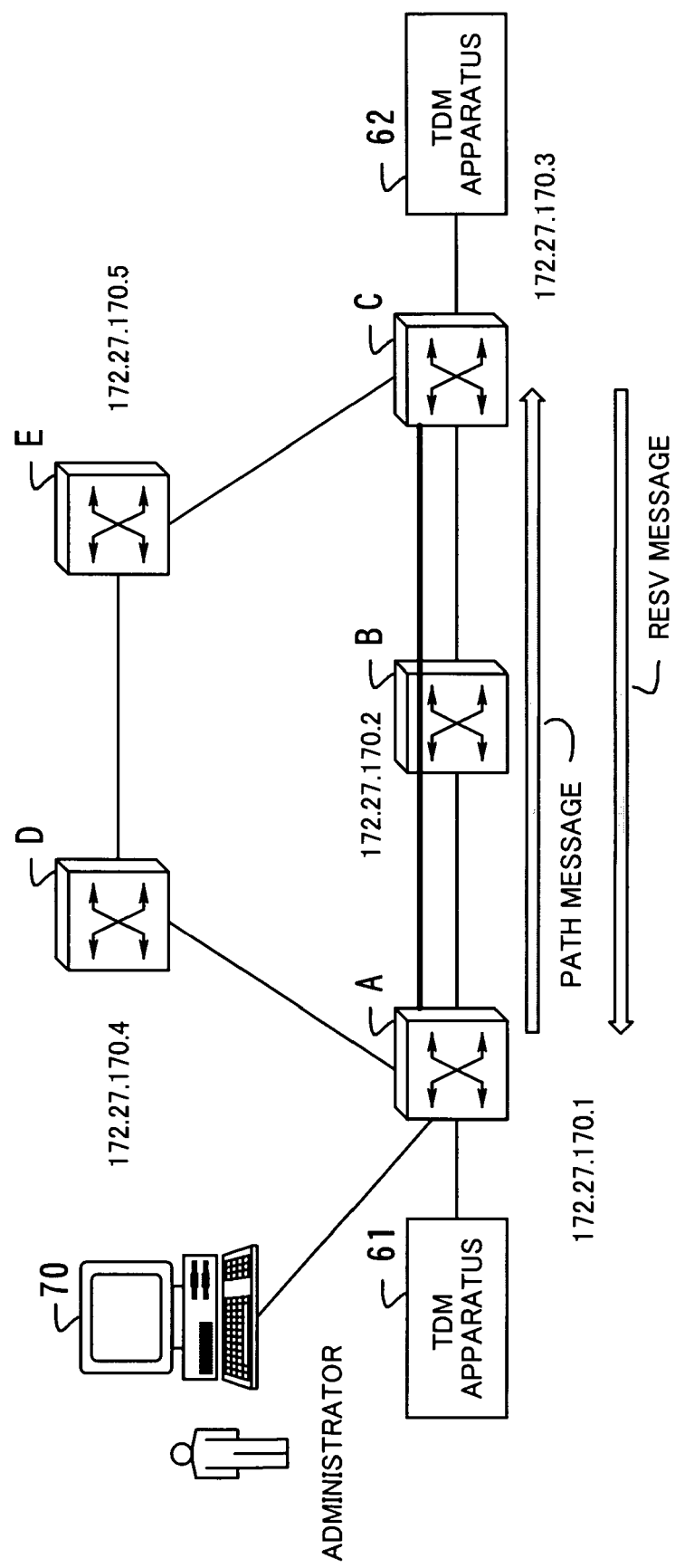
FIG. 31 shows the addition of a first component link.

FIG. 31 shows the addition of a first component link. A Path message sent from the node A reaches the destination node, the node C, through the node B as shown in the figure. In this way, according to the specified destination-node ID, a bundled link to be bundled can be automatically determined.

When the receiving-side node, the node C, receives the Path message, the message reaches the bundle management section 22 through the control-channel interface section 50, the signaling control section 25, and the path management section 21. The operation thereof has already been described, therefore, no description is made here.

The bundle management section 22 indexes the bundle management table T3 shown in FIG. 17 by the bundled-path ID (172.27.170.1 (ID of the node A)+1 (bundle ID)), and recognizes that a bundled link has already been specified because the destination-node ID (172.27.170.3 (node C)) has already been registered.

The bundle management section 22 specifies the path ID (172.27.170.1 (ID of the node A)+an LSP_ID of 2) of the component link to be added in the table, and adds 10 Gbps to the total bandwidth to set it to 20 Gbps. The bundle management section 22 also increments the number of component links by 1 to set it to 2, and then, returns the control to the path management section 21.

The path management section 21 requests a wavelength-label assignment and requests the signaling control section 25 to send a Resv message, as described above. In this way, the Resv message sent from the node C reaches the transmission-side node, the node A, through the node B, as shown in FIG. 31.

When the transmission-side node, the node A, receives the Resv message for the component link, the path management section 21 specifies the output wavelength label in the path management table T2 shown in FIG. 13, and the bundle management section 22 updates the bundle management table T3 (specifies the component-link path ID, adds 10 Gbps to the total bandwidth, and increments the number of component links by 1) shown in FIG. 17, as described above.

The path management section 21 further reports the bundled-link route information to the route-information control section 32, and reports the completion of the component-link setting to the command interface control section 40. The command interface control section 40 reports the completion to the administrator. The administrator recognizes that the component-link setting has been finished.

In the node A, the route-information control section 32 receives the bundled-link route information from the path management section 21, and determines that the data base to be controlled is that for the wavelength layer according to the reported route information.

Then, the route-information control section 32 searches the TEDB (for the wavelength layer) L2 by the node ID, which is a part of the route information, for a TE LSA to be handled. In this case, since the bundled link has already been specified, a TE LSA to be handled exists.

A new TE LSA is not generated as another path caused by the addition of the component link, but an increase in the bandwidth of the bundled link, caused by the addition of the component link, is added to the TE LSA already generated.

Therefore, the physical bandwidth in the TE LSA is changed to 20 Gbps, which is the total bandwidth of the bundled link. The unused bandwidth of the bundled link or an unused bandwidth of each component link may be specified in the TE LSA. These pieces of information needs to be updated.

Next, the route-information control section 32 determines whether to immediately advertise the TE LSA after it calculates the route by using the Dijkstra algorithm. In this case, since "advertised immediately" was specified, the route-information control section 32 requests the advertisement section 33 to advertise the generated TE LSA, and the advertisement section 33 advertises the TE LSA through the control-channel interface section 50.

Figure 32:
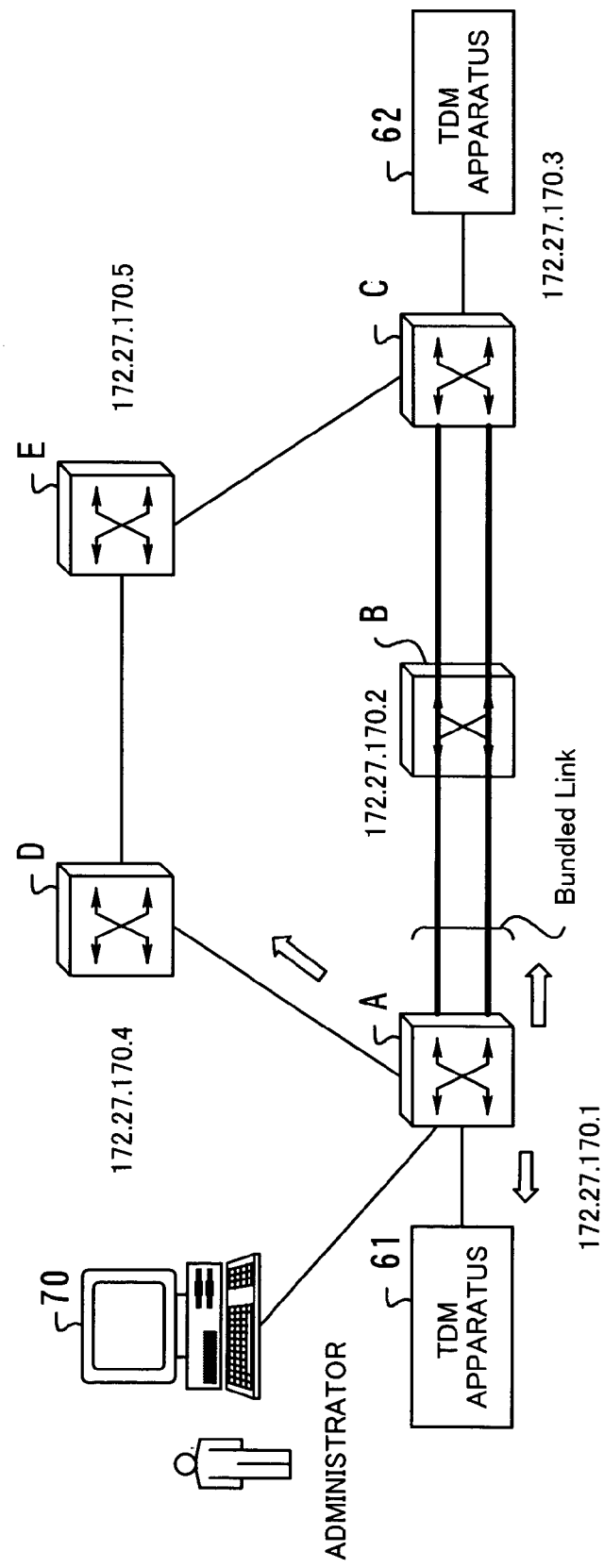
FIG. 32 shows a bundled link after the first component link is added.

FIG. 32 shows the bundled link obtained after the first component link was added. Since the TE LSA advertised by the node A reaches the whole part of the network shown in the figure, the TDM apparatuses 61 and 62 can recognize that the wavelength path from the node A to the node C has increased its rate of 10 Gbps to a rate of 20 Gbps.

As described above, the component link can be added to the bundled link as a path, and it is possible to advertise in the network that the bandwidth of the bundled link has been virtually increased by the addition of the component link.

Next, "the addition of a second component link (not-immediate advertisement specified)" will be described. After "the addition of a first component link (immediate advertisement specified)", already described, the operation of each node in a case in which a second-component-link setting request is received from the administrator shown in FIG. 32 will be described.

It is assumed that the administrator specifies a component link (wavelength path) to be added to the bundled link, from the node A (172.27.170.1) to the node C (172.27.170.3). It is also assumed that the bandwidth of the wavelength path is fixed to 10 Gbps, and the administrator specifies in parameters at the path request that a destination-node ID is 172.27.170.3 (node C), the path is to be bundled, and route information is not automatically advertised after the wavelength path is established.

How to specify a path when a component link from the node A to the node C is added has been described above for "the addition of a first component link (immediate advertisement specified)", therefore, a description thereof is omitted here. A route-information advertisement performed after path setting will be described below because it is different from that performed in "the addition of a first component link (immediate advertisement specified)".

In the node A, the route-information control section 32 receives the route information of the bundled link from the path management section 21 after the component link has been specified, then searches the TEDB (for the wavelength layer) L2 for the corresponding TE LSA, and updates the physical bandwidth in the TE LSA from 20 Gbps to 30 Gbps.

Next, the route-information control section 32 determines whether to immediately advertise the TE LSA after it calculates the route by using the Dijkstra algorithm. In this case, since "advertised not immediately" was specified, the route-information control section 32 terminates the processing without advertising the generated TE LSA. Whether to advertise a TE LSA can be specified for each path. However, whether to advertise a TE LSA may be specified not for each path but for a bundled link.

Figure 33:
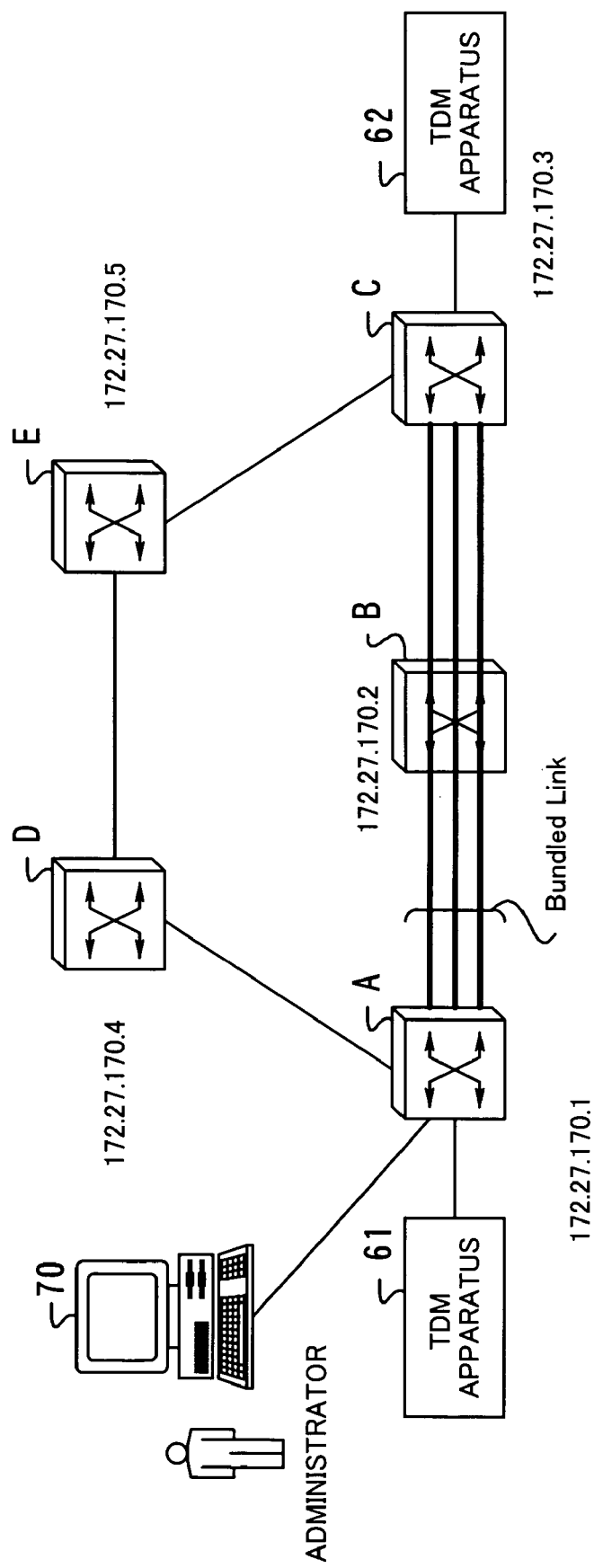
FIG. 33 shows a bundled link after a second component link is added.

FIG. 33 shows the bundled link obtained after the second component link was added. The component link has been added as in the network shown in the figure, but the other nodes do not know the addition. This is very useful for when route information is not imprudently advertised at the transition of bundled-link setting or for when a load is not recklessly imposed on the network.

Next, "the addition of a third component link (immediate advertisement specified)" will be described. After "the addition of a second component link (not-immediate advertisement specified)", already described, the operation of each node in a case in which a third-component-link setting request is received from the administrator shown in FIG. 32 will be described.

It is assumed that the administrator specifies a component link (wavelength path) to be added to the bundled link, from the node A (172.27.170.1) to the node C (172.27.170.3). It is also assumed that the bandwidth of the wavelength path is fixed to 10 Gbps, and the administrator specifies in parameters at the path request that a destination-node ID is 172.27.170.3 (node C), the path is to be bundled, and route information is automatically advertised after the wavelength path is established.

How to specify a path when a component link from the node A to the node C is added has been described above for "the addition of a first component link (immediate advertisement specified)", therefore, a description thereof is omitted here. A route-information advertisement performed after path setting will be described below because it is different from that performed in "the addition of a first component link (immediate advertisement specified)".

In the node A, the route-information control section 32 receives the route information of the bundled link from the path management section 21 after the component link has been specified, then searches the TEDB (for the wavelength layer) L2 for the corresponding TE LSA, and updates the physical bandwidth in the TE LSA from 30 Gbps to 40 Gbps.

Next, the route-information control section 32 determines whether to immediately advertise the TE LSA after it calculates the route by using the Dijkstra algorithm. In this case, since "advertised immediately" was specified, the route-information control section 32 requests the advertisement section 33 to advertise the generated TE LSA, and the advertisement section 33 advertises the TE LSA through the control-channel interface section 50.

Figure 34:
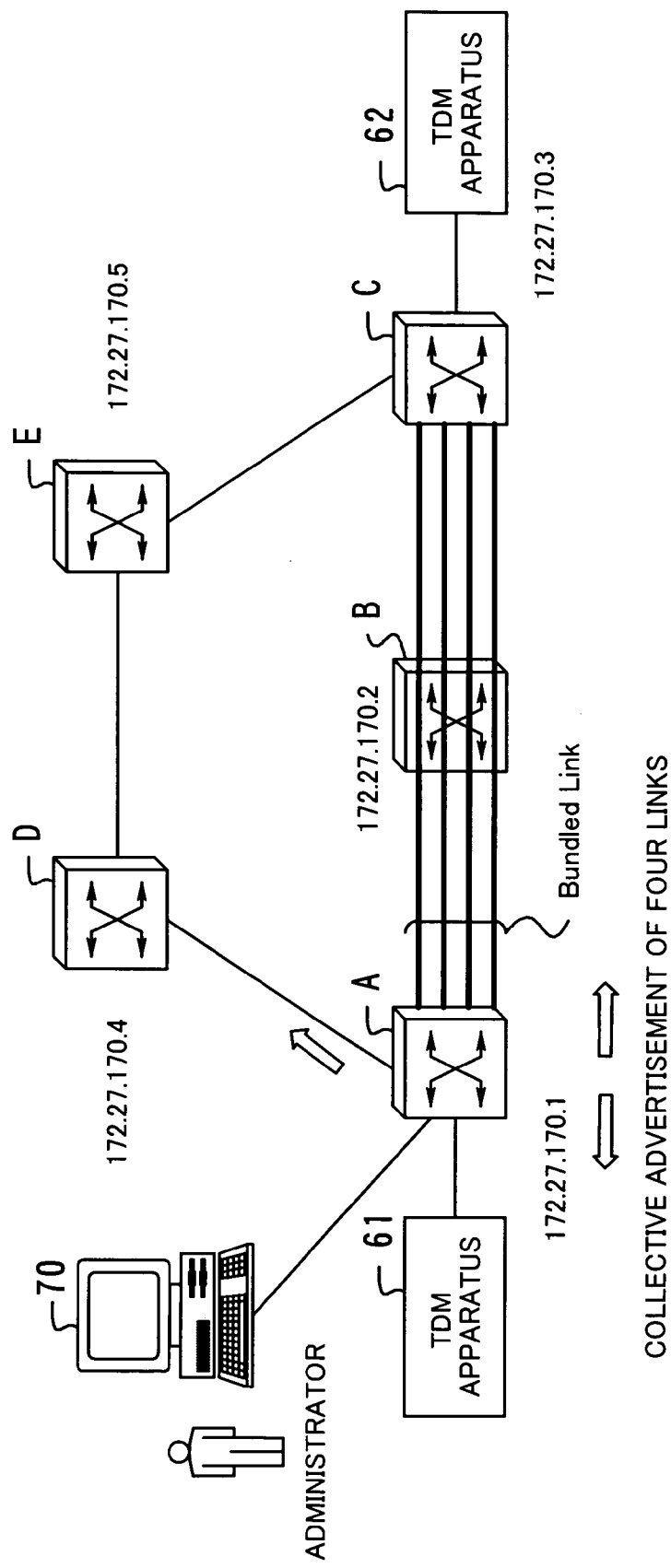
FIG. 34 shows a bundled link after a third component link is added.

FIG. 34 shows the bundled link obtained after the third component link was added. Since the TE LSA advertised by the node A reaches the whole part of the network shown in the figure, the TDM apparatuses 61 and 62 can recognize that the wavelength path from the node A to the node C has increased its rate of 20 Gbps at the time when the previous TE LSA was received, to a rate of 40 Gbps.

As described above, in the present invention, it is possible to collectively advertise the route information after a plurality of paths has been specified, instead of advertising the route information each time a path has been specified.

Figure 35:
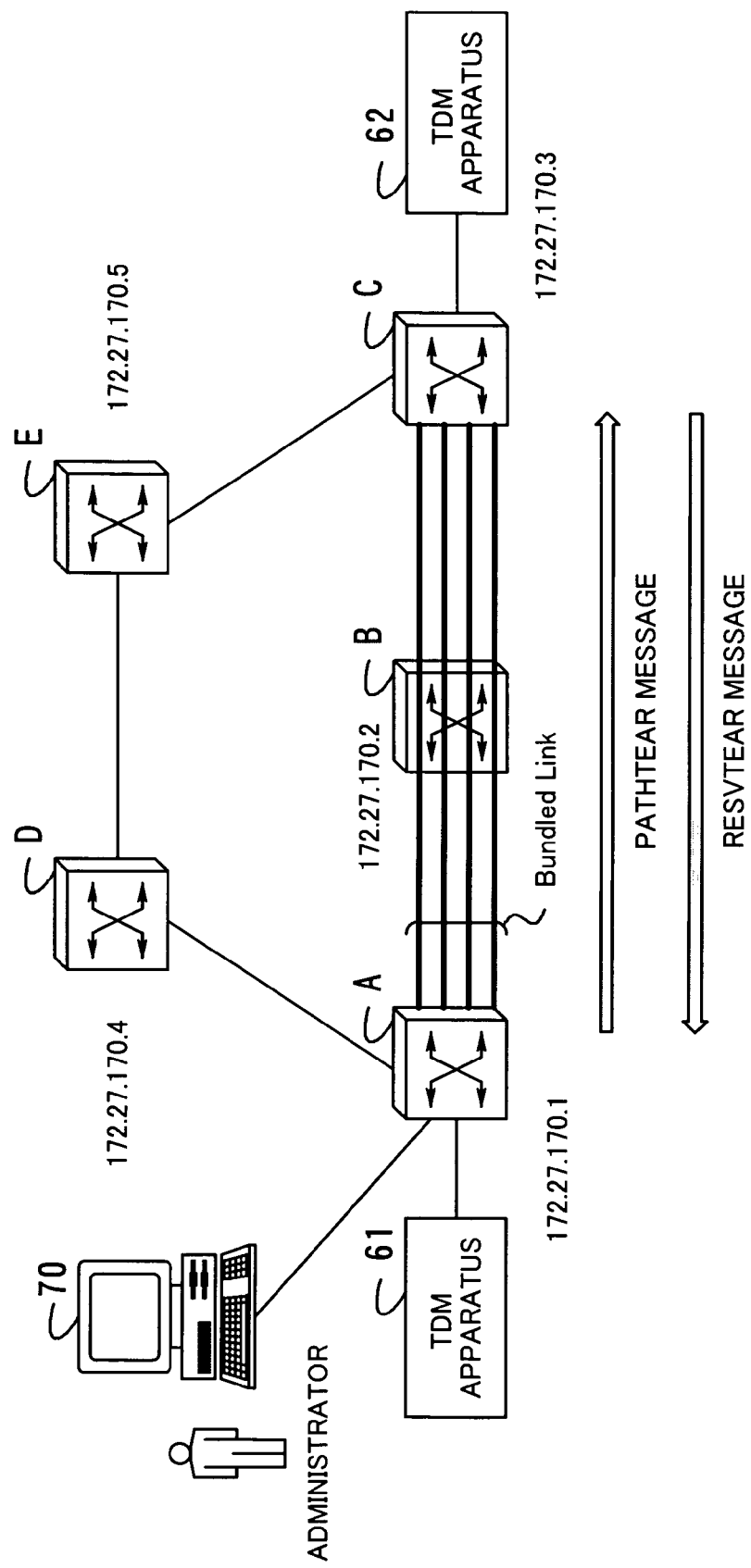
FIG. 35 shows the deletion of a component link.

Next, "component-link deletion (immediate advertisement specified)" will be described. FIG. 35 shows a component-link deletion. At the "third component-link addition (immediate advertisement specified)", already described, the operation of each node in a case in which a component-link deletion request is received from an administrator shown in the figure will be described.

It is assumed that the administrator deletes a component link (wavelength path) in the bundled link set from the node A (172.27.170.1) to the node C (172.27.170.3). It is also assumed that the administrator specifies in parameters at the path-deletion request that a destination-node ID is 172.27.170.3 (node C), the path can be bundled, and route information is automatically advertised after the wavelength path is deleted.

The administrator may specify a component link to be deleted, from a plurality of existing component links. The description will be made here assuming that not the administrator but the apparatus automatically selects a component link to be deleted.

In the same way as in the component-link addition, when the administrator inputs a component-link deletion request to the node A, the processing flow reaches the bundle search section 23 through the command interface control section 40, the path management section 21, and the bundle management section 22.

The bundle search section 23 searches the bundle management table T3 shown in FIG. 17 for a path to be bundled, according to the ID (172.27.170.3) of the node C, the destination node, input by the administrator, and reports the extracted bundled-path ID (172.27.170.1 (ID of node A)+1 (bundle ID)) of the path to be bundled to the bundle management section 22.

The bundle management section 22 indexes the bundle management table T3 shown in FIG. 17 by the extracted bundle-path ID, extracts the bundle ID of the component link to be deleted, and reports the extracted path ID to the path management section 21.

The path management section 21 requests the signaling control section 25 to send a PathTear message in order to delete the path specified by the component-link path ID. The signaling control section 25 edits the PathTear message, and sends it through the control-channel interface section 50. In this way, the PathTear message sent from the node A reaches the destination node, the node C, through the node B as shown in FIG. 35.

When the receiving-side node, the node C, receives the PathTear message, the message reaches the bundle management section 22 through the control-channel interface section 50, the signaling control section 25, and the path management section 21. The operation thereof is the same as that described for the component-link addition, therefore, no description is made here.

The bundle management section 22 indexes the bundle management table T3 shown in FIG. 17 by the bundled-path ID (172.27.170.1 (ID of the node A)+1 (bundle ID)), deletes the path ID of the component link to be deleted, from the table, reduces the total bandwidth by 10 Gbps from the current level, 40 Gbps, to 30 Gbps, reduces the number of component links by 1 to 3, and returns the control to the path management section 21.

The path management section 21 requests a wavelength-label release, indexes the path management table T2 shown in FIG. 13 by the path ID of the component link to be deleted, clears the corresponding area, and requests the signaling control section 25 to send a ResvTear message. In this way, the ResvTear message sent from the node C reaches the transmission-side node, the node A, through the node B, as shown in FIG. 35.

When the transmission-side node, the node A, receives the ResvTear message for the component link, the path management section 21 requests the bundle management section 22 to delete the bundle.

The bundle management section 22 updates the bundle management table T3 (deletes the path ID of the component link, reduces the total bandwidth by 10 Gbps, and reduces the number of component links by 1) shown in FIG. 17, as already described in the receiving-side-node processing, and returns the control to the path management section 21.

The path management section 21 clears the path management table T2 shown in FIG. 13, as already described in the receiving-side-node processing, reports the bundled-link route information to the route-information control section 32, and reports the completion of the component-link deletion to the command interface control section 40. The command interface control section 40 reports the completion to the administrator. The administrator recognizes that the component-link deletion has been finished.

In the node A, the route-information control section 32 receives the bundled-link route information from the path management section 21 after the completion of the component-link deletion, searches the TEDB (for the wavelength layer) L2 for the corresponding TE LSA, and updates the physical bandwidth in the TE LSA from 40 Gbps to 30 Gbps.

Next, the route-information control section 32 determines whether to immediately advertise the TE LSA after it calculates the route by using the Dijkstra algorithm. In this case, since "advertised immediately" was specified, the route-information control section 32 requests the advertisement section 33 to advertise the generated TE LSA, and the advertisement section 33 advertises the TE LSA through the control-channel interface section 50.

Since the TE LSA advertised by the node A reaches the whole part of the network shown in FIG. 35, the TDM apparatuses 61 and 62 can recognize that the wavelength path from the node A to the node C has reduced its rate of 40 Gbps to a rate of 30 Gbps.

As described above, a component link constituting the bundled link can be deleted, and it is possible to advertise in the network that the bandwidth of the bundled link has been virtually reduced by the deletion of the component link.

Figure 36:
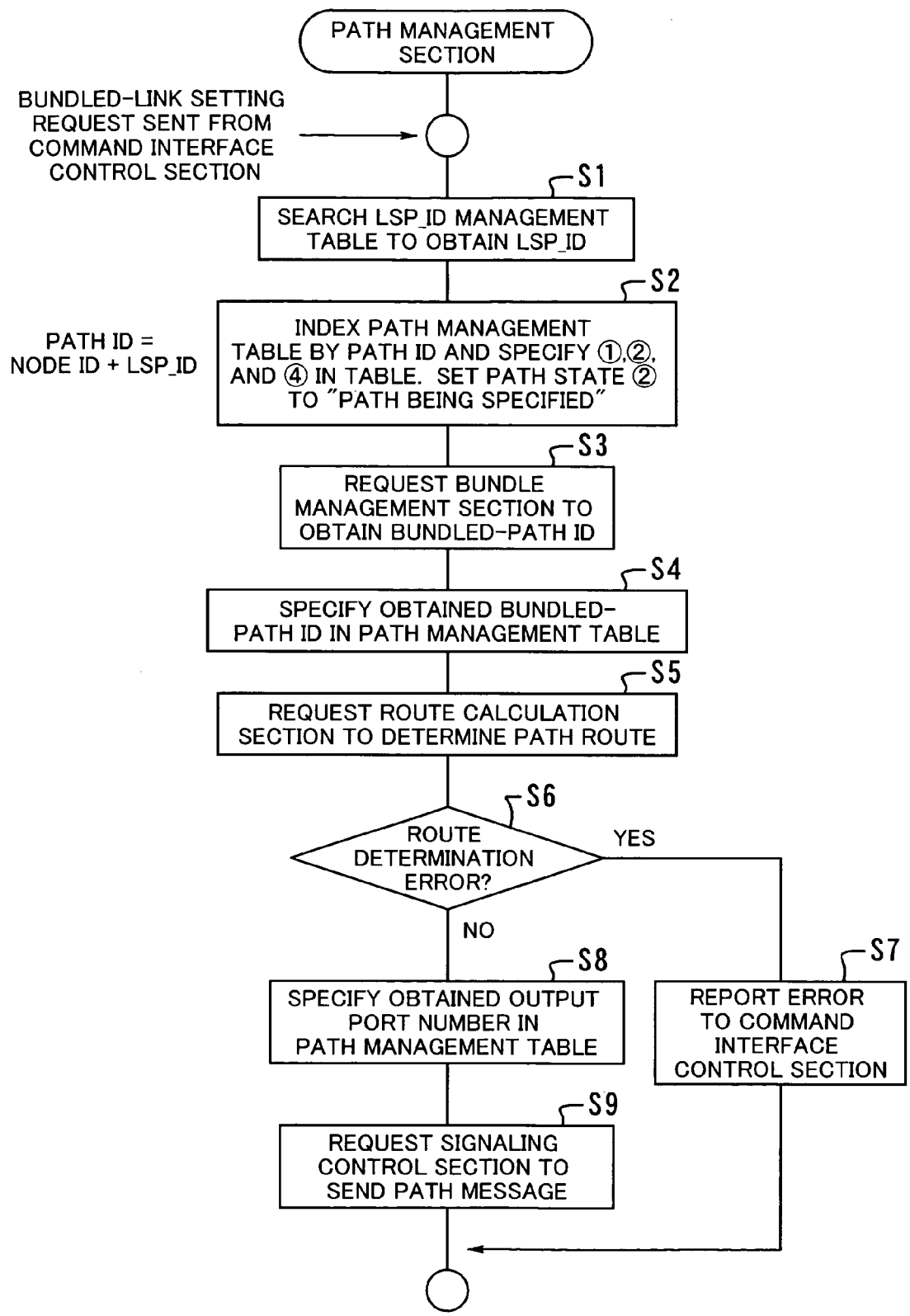
FIG. 36 is a flowchart of processing of a path management section for path setting.

Operations in the present invention will be described next by referring to flowcharts. FIG. 36 shows the processing flow of the path management section for path setting. The command interface control section 40 of the transmission-side node actives the processing.

Step S1: When the path management section 21 receives a bundled-link setting request from the command interface control section 40, the path management section 21 searches the LSP_ID management table T1 to obtain an LSP_ID.

Step S2: The path management section 21 indexes the path management table T2 by the path ID to specify the destination-node ID and the input port number and to set the path state to "path being specified".

Step S3: The path management section 21 requests the bundle management section 22 to obtain a bundled-path ID.

Step S4: The path management section 21 specifies the obtained bundled-path ID in the path management table T2.

Step S5: The path management section 21 requests the route calculation section 31 to determine a path route.

Step S6: If a route determination has an error, the processing proceeds to step S7. If not, the processing proceeds to step S8.

Step S7: The path management section 21 reports the error to the command interface control section 40.

Step S8: The path management section 21 specifies the obtained output port number in the path management table T2.

Step S9: The path management section 21 requests the signaling control section 25 to send a Path message.

Figure 37:
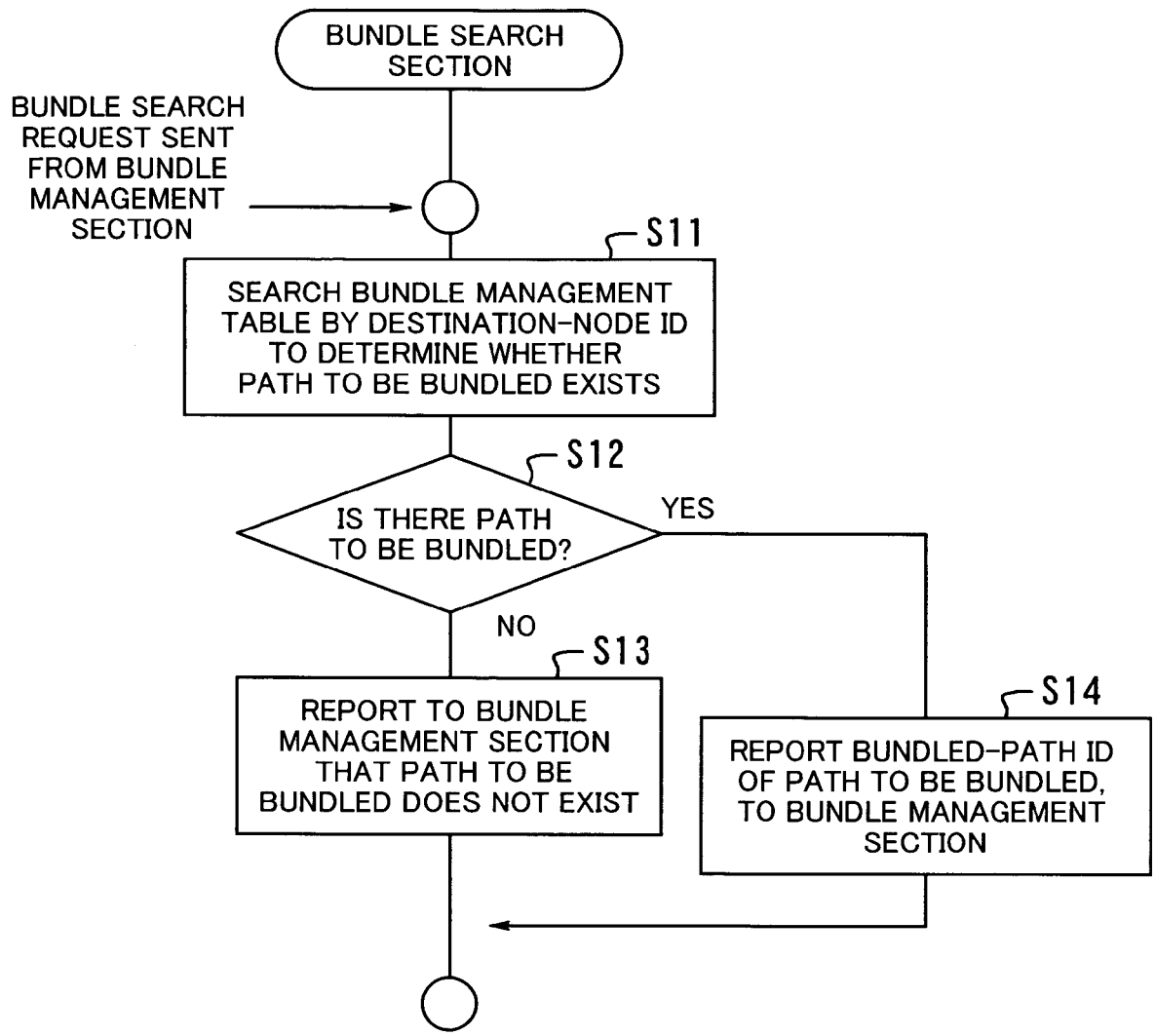
FIG. 37 is a flowchart of processing of a bundle search section.

FIG. 37 shows the processing flow of the bundle search section 23 in the transmission-side node.

Step S11: When the bundle search section 23 receives a bundle search request from the bundle management section 22, the bundle search section 23 searches the bundle management table T3 by the destination-node ID to check whether a path to be bundled exists.

Step S12: If there is no path to be bundled, the processing proceeds to step S13. If there is a path to be bundled, the processing proceeds to step S14.

Step S13: The bundle search section 23 reports to the bundle management section 22 that there is no path to be bundled.

Step S14: The bundle search section 23 reports the bundled-path ID of the path to be bundled, to the bundle management section 22.

Figure 38:
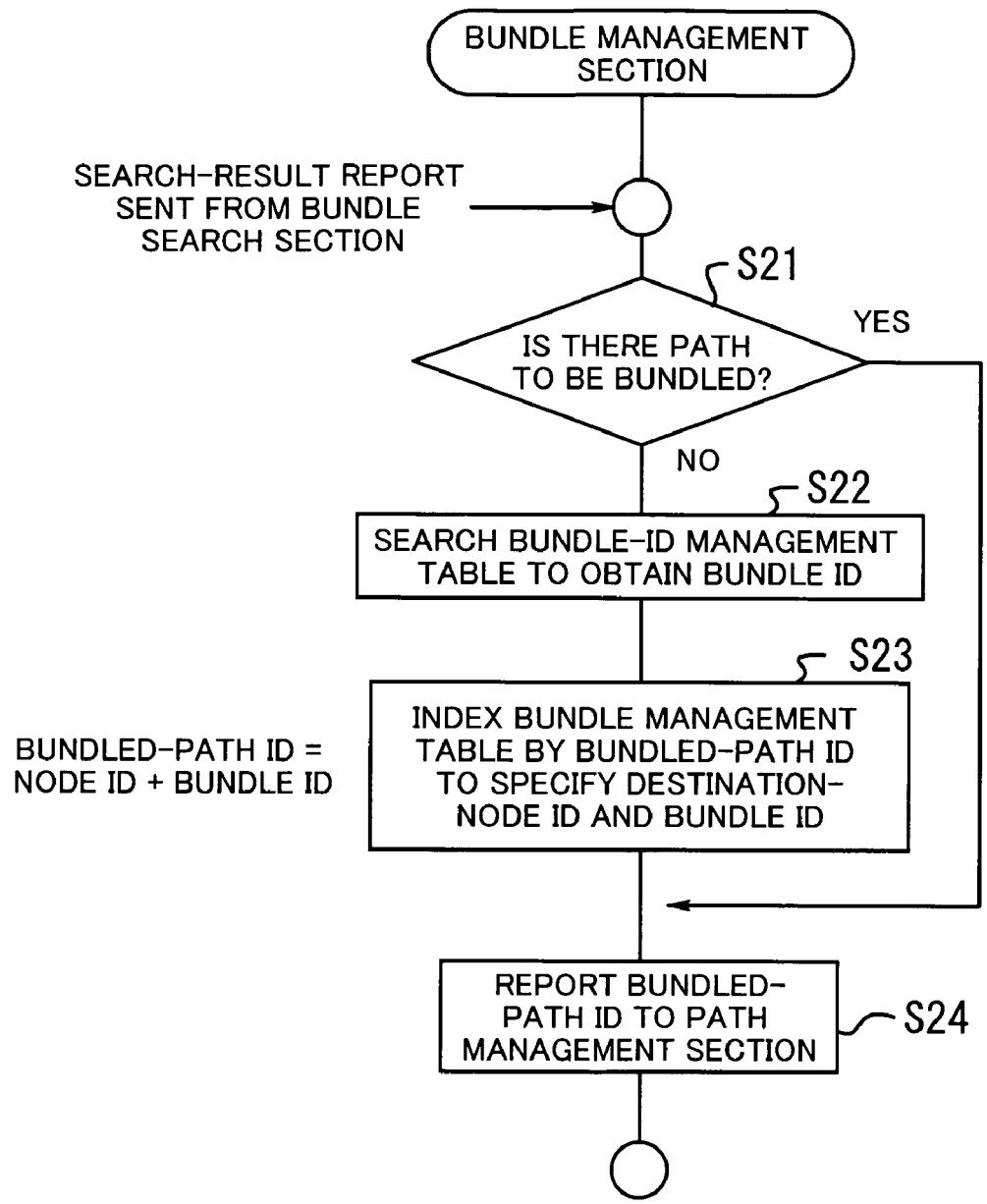
FIG. 38 is a flowchart of processing of a bundle management section for path setting.

FIG. 38 shows the processing flow of the bundle management section 22 for path setting. The bundle search section 23 in the transmission-side node activates the processing.

Step S21: The bundle management section 22 receives the result of search from the bundle search section 23. If there is no path to be bundled, the processing proceeds to step S22. If there is a path to be bundled, the processing proceeds to step S24.

Step S22: The bundle management section 22 searches the bundle ID management table T3 to obtain a bundle ID.

Step S23: The bundle management section 22 indexes the bundle management table T3 by the bundled-path ID to specify the destination-node ID and the bundle ID.

Step S24: The bundle management section 22 reports the bundled-path ID to the path management section 21.

Figure 39:
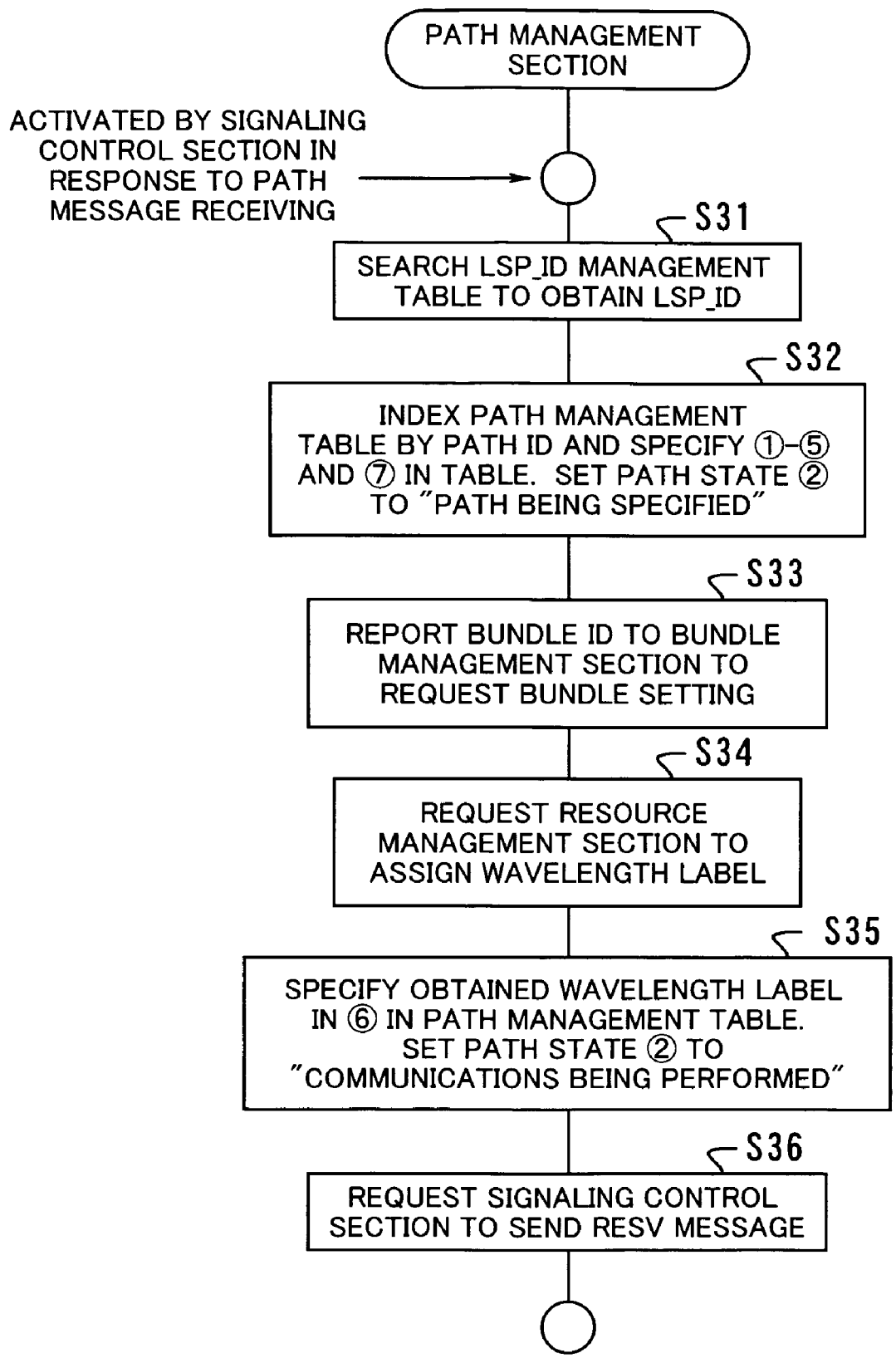
FIG. 39 is a flowchart of processing of the path management section for path setting.

FIG. 39 shows the processing flow of the path management section 21 for path setting. The signaling control section 25 in the receiving-side node activates the processing.

Step S31: When the signaling control section 25 activates the processing in response to Path-message receiving, the path management section 21 searches the LSP_ID management table T1 to obtain an LSP_ID.

Step S32: The path management section 21 indexes the path management table T2 by the path ID to specify the destination-node ID, the path state, the bundled-path ID, the input port number, the output port number, and the output wavelength label. The path state is set to "path being specified".

Step S33: The path management section 21 reports the bundle ID to the bundle management section 22 to requests bundle setting.

Step S34: The path management section 21 requests the resource management section 24 to assign a wavelength label.

Step S35: The path management section 21 specifies the obtained wavelength label in the input wavelength label field of the path management table T2. The path state is set to "communications being performed".

Step S36: The path management section 21 requests the signaling control section 25 to send an Resv message.

Figure 40:
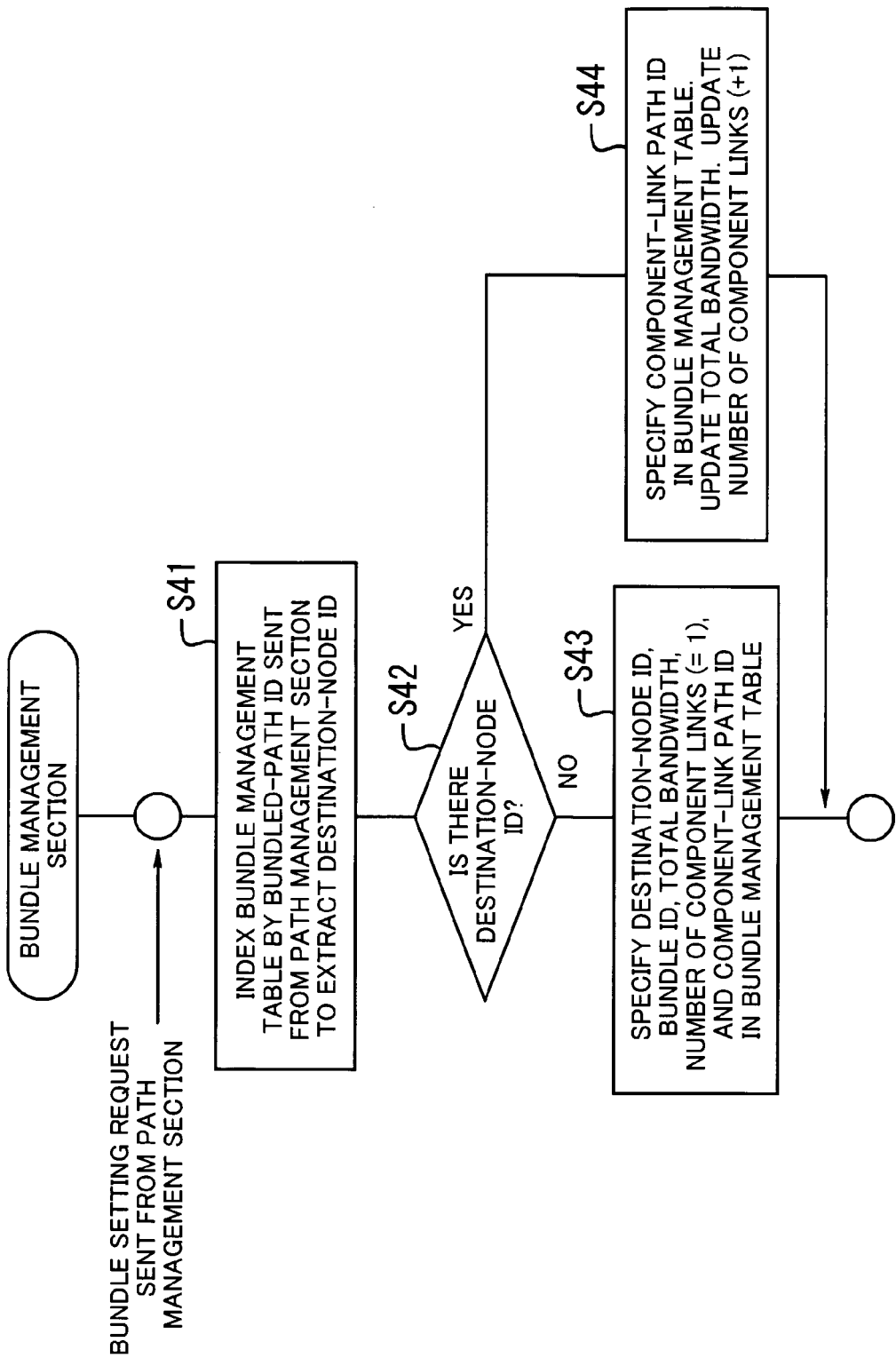
FIG. 40 is a flowchart of processing of the bundle management section for path setting.

FIG. 40 shows the processing flow of the bundle management section 22 for path setting. The path management section 21 in the receiving-side node activates the processing.

Step S41: When the bundle management section 22 receives the bundle setting request from the path management section 21, the bundle management section 22 indexes the bundle management table T3 by the bundled-path ID reported from the path management section 21 to extract the destination-node ID.

Step S42: When there is no destination-node ID, the processing proceeds to step S43. When the destination-node ID is extracted, the processing proceeds to step S44.

Step S43: The bundle management section 22 specifies the destination-node ID, the bundle ID, the total bandwidth, the number of component links (=1), and the component-link path ID in the bundle management table T3.

Step S44: The bundle management section 22 specifies the component-link path ID in the bundle management table T3, and updates the total bandwidth and the number of component links.

Figure 41:
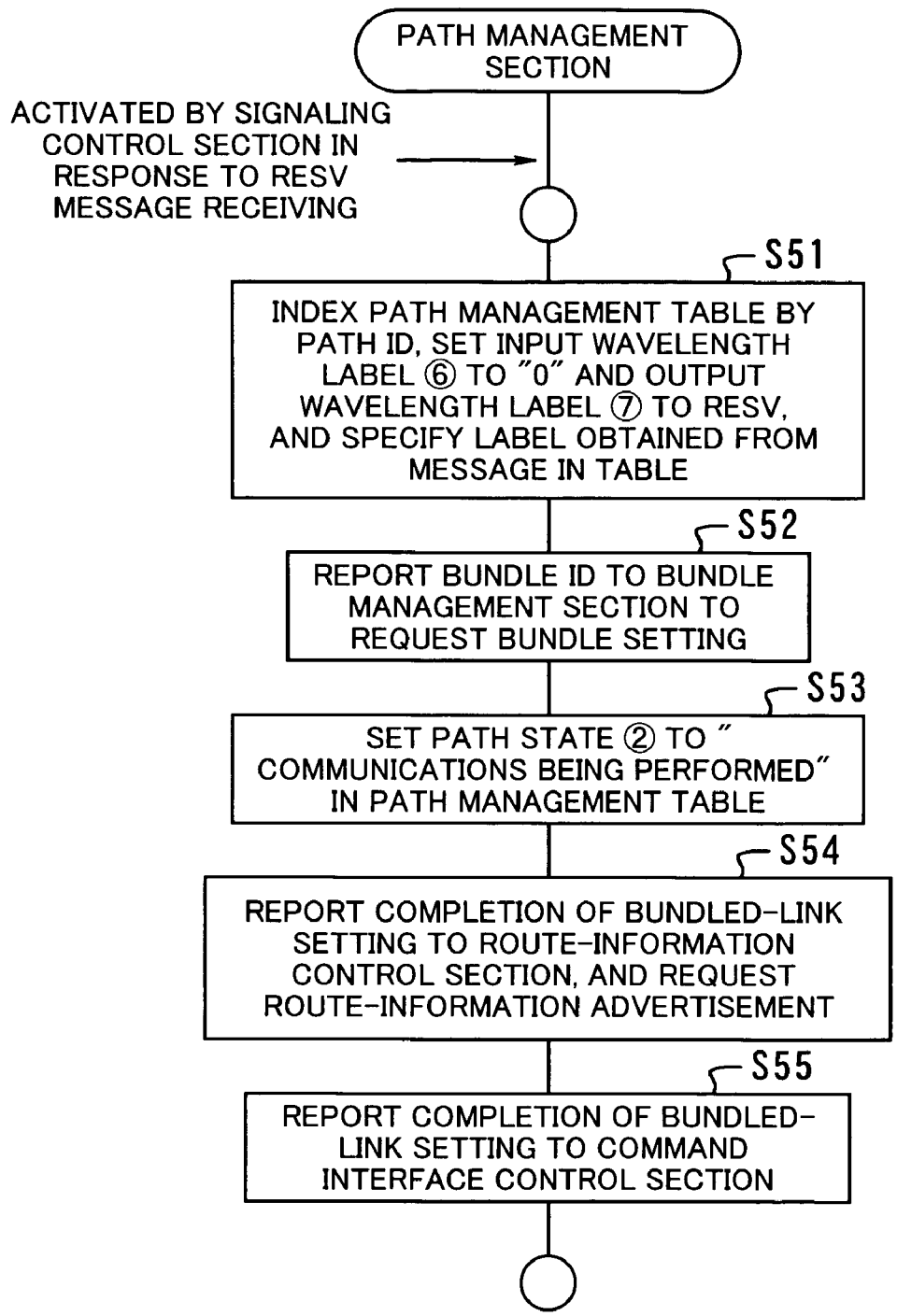
FIG. 41 is a flowchart of processing of the path management section for path setting.

FIG. 41 shows the processing flow of the path management section 21 for path setting. The signaling control section 25 in the transmission-side node activates the processing.

Step S51: When the signaling control section 25 activates the processing in response to Resv-message receiving, the path management section 21 indexes the path management table T2 by the path ID to specify the input wavelength label to "0" and the output wavelength label to the label obtained from the Resv message.

Step S52: The path management section 21 reports the bundle ID to the bundle management section 22 to requests bundle setting.

Step S53: The path management section 21 sets the path state in the path management table T2 to "communications being performed".

Step S54: The path management section 21 reports the route-information control section 32 that bundle setting has been completed, and requests route-information advertisement.

Step S55: The path management section 21 reports the command interface control section 40 that bundled-link setting has been completed.

Figure 42:
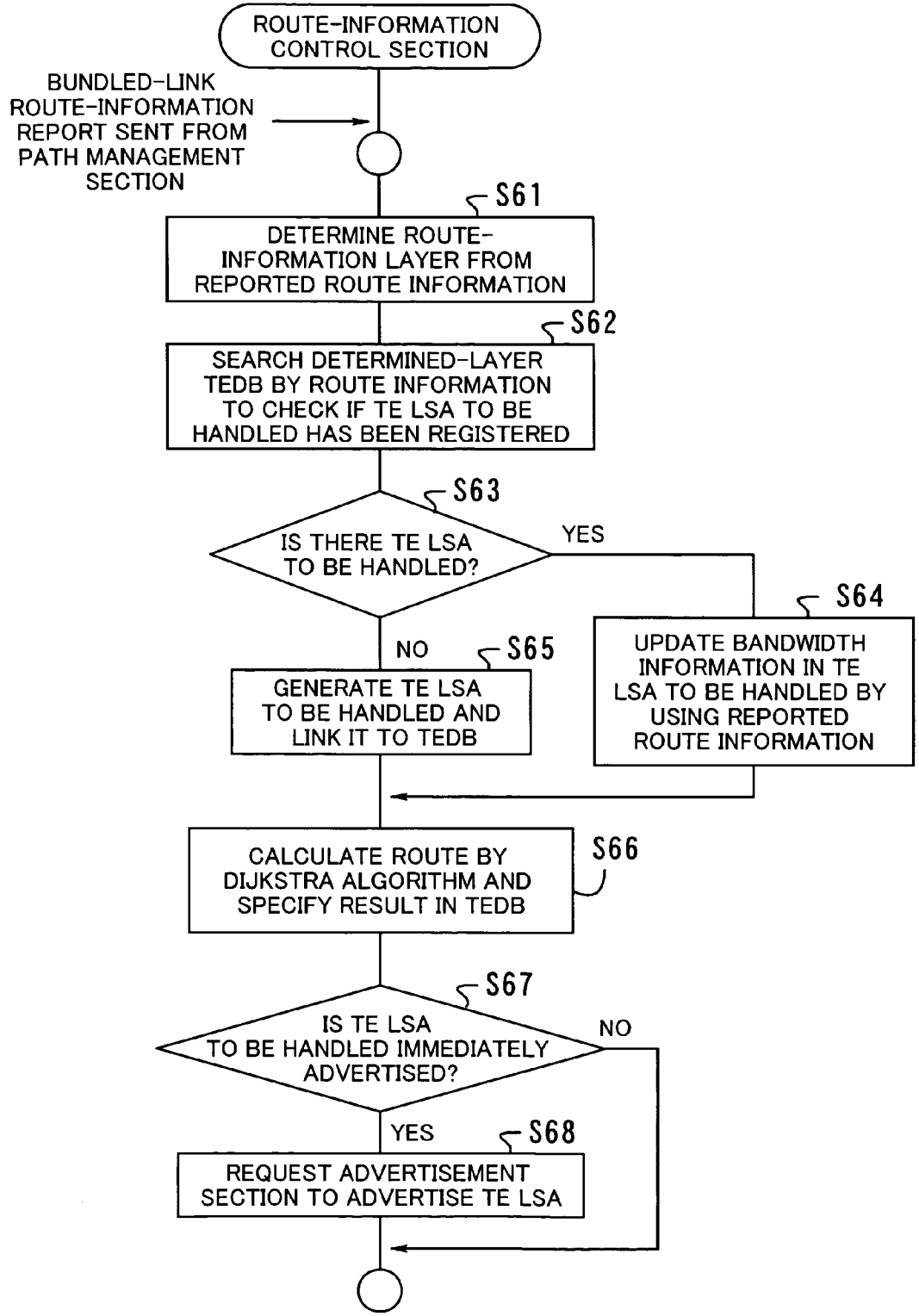
FIG. 42 is a flowchart of processing of a route-information control section.

FIG. 42 shows the processing flow of the route-information control section 32. The path management section 21 activates the processing in the processing performed at a path-end node.

Step S61: When the route-information control section 32 receives the bundled-link route information from the path management section 21, the route-information control section 32 determines a layer for route information from the route information received.

Step S62: The route-information control section 32 searches the TEDB for the determined layer by the route information to determine whether the corresponding TE LSA has been registered.

Step S63: When the corresponding TE LSA is found, the processing proceeds to step S64. If not, the processing proceeds to step S65.

Step S64: The route-information control section 32 updates the bandwidth information in the corresponding TE LSA by using the route information received.

Step S65: The route-information control section 32 generates a TE LSA and links it to the TEDB.

Step S66: The route-information control section 32 calculates a route by the Dijkstra algorithm, and specifies the result in the TEDB.

Step S67: When the corresponding TE LSA is to be immediately advertised, the processing proceeds to step S68. If not, the processing skips step S68.

Step S68: The route-information control section 32 requests the advertisement section 33 to advertise the TE LSA.

Figure 43:
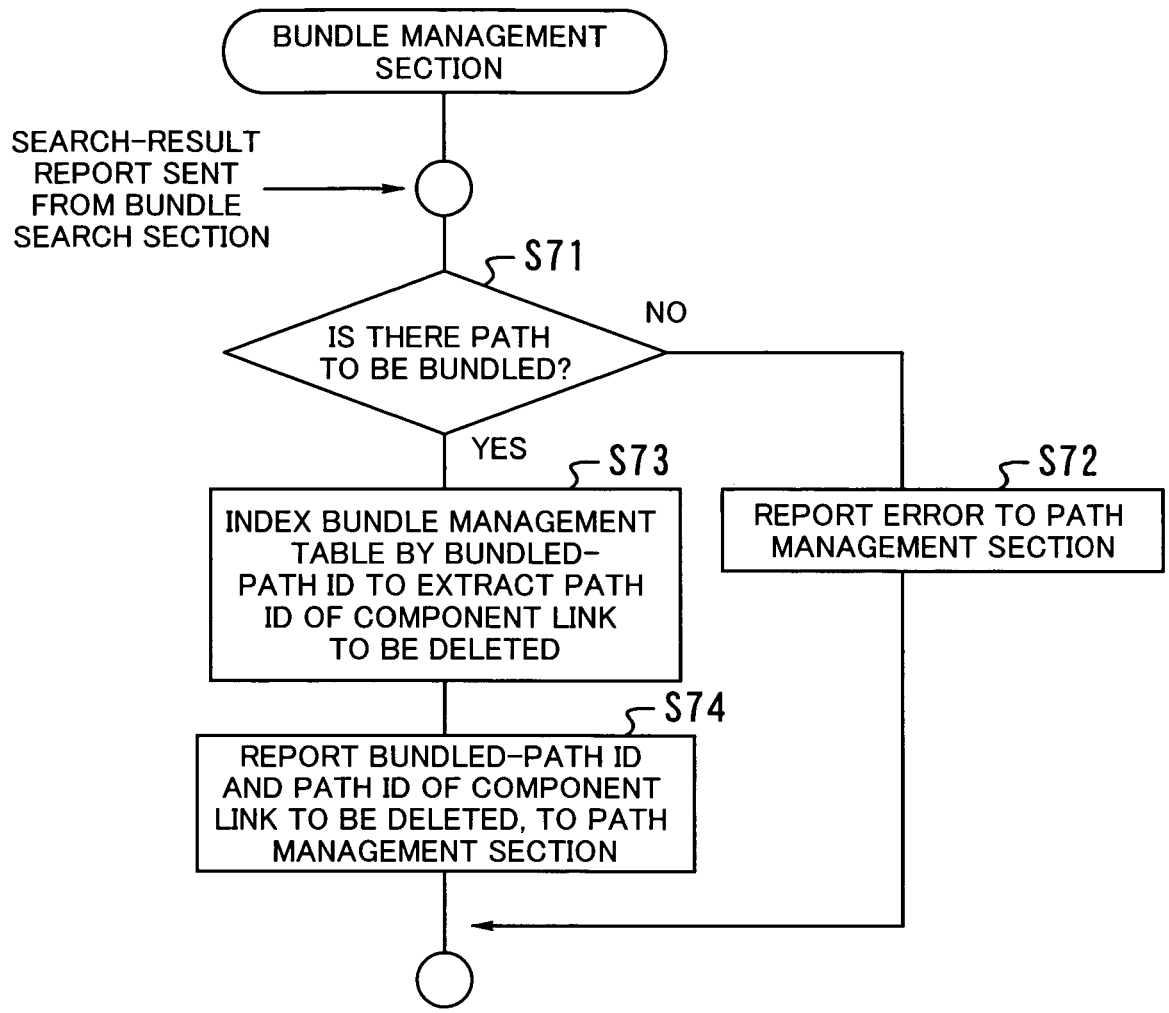
FIG. 43 is a flowchart of processing of the bundle management section for path deletion.

FIG. 43 shows the processing flow of the bundle management section 22 for path deletion. The bundle search section 23 in the transmission-side node activates the processing.

Step S71: When the bundle management section 22 receives the search result from the bundle search section 23, if there is no path to be bundled, the processing proceeds to step S72. If there is a path to be bundled, the processing proceeds to step S73.

Step S72: The bundle management section 22 reports an error to the bundle management section 21.

Step S73: The bundle management section 22 indexes the bundle management table T3 by the bundled-path ID to extract the path ID of the component link to be deleted.

Step S74: The bundle management section 22 reports the bundled-path ID and the path ID of the component link to be deleted, to the path management section 21.

Figure 44:
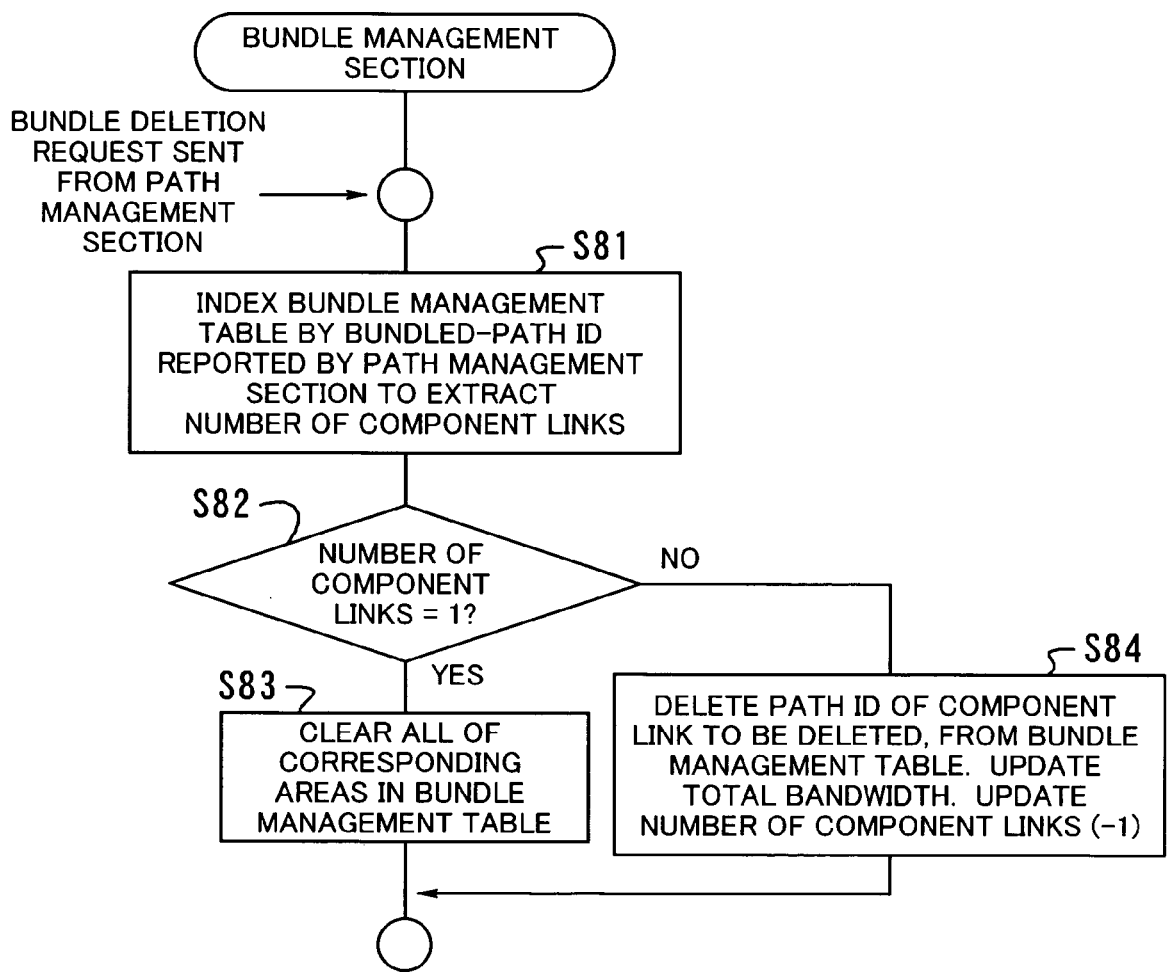
FIG. 44 is a flowchart of processing of the bundle management section for path deletion.

FIG. 44 shows the processing flow of the bundle management section 22 for path deletion. The path management section 21 in the receiving-side node activates the processing.

Step S81: When the bundle management section 22 receives a bundle deletion request from the path management section 21, the bundle management section 22 indexes the bundle management table T3 by the bundled-path ID received from the path management section 21 to extract the number of component links.

Step S82: When the number of component links is 1, the processing proceeds to step S83. If not, the processing proceeds to step S84.

Step S83: The bundle management section 22 clears all of the corresponding areas in the bundle management table T3.

Step S84: The bundle management section 22 deletes the path ID of the component link to be deleted, from the bundle management table T3, and updates the total bandwidth and the number of component links.

Figure 45:
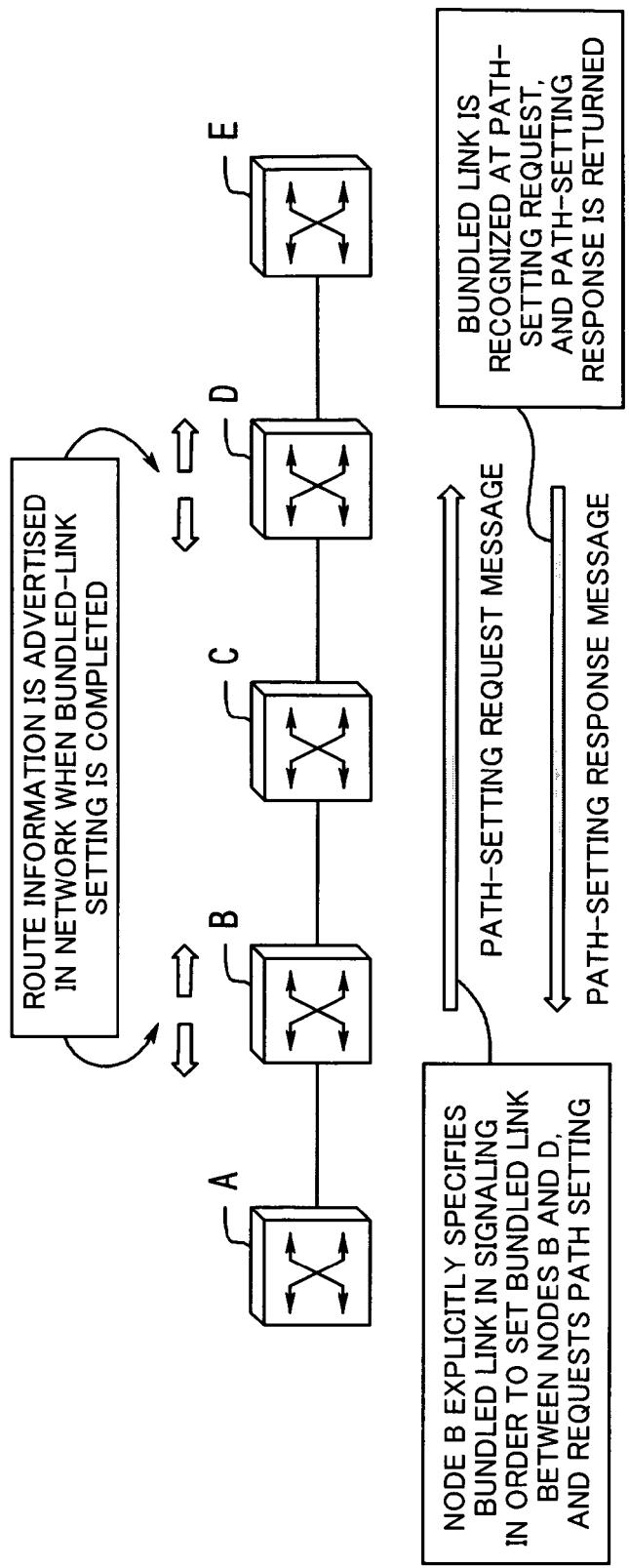
FIG. 45 shows bundled-link path setting.

Next, the conventional technology and the present invention will be compared and described. Bundled-link path setting will be described first. FIG. 45 shows bundled-link path setting. A node A to a node E are connected in series. In link bundling, unlike the conventional technology, where bundle setting is applied to a path which has already been set, the present invention allows, as shown in the figure, a path to be set as a bundled link by explicitly specifying in signaling that "the path is being set as a bundled link". Each node can advertise route information as bundled-link information from the beginning.

When the command interface control section 40 of the node B receives a bundled-link setting command, the command interface control section 40 reports the command and its parameters to the path management section 21. The parameters at least specifies information indicating a destination address and bundle setting.

In the conventional technology, since link bundling ties up paths which have already been set, path setting is not performed in link bundling. In the present invention, however, the path management section 21 generates the information of a path to be set, and reports the bundled-link path information (including the destination address) to the bundle management section 22 and requests bundle setting.

In the conventional technology, a bundle management section ties up paths which have already existed. In the present invention, however, the bundle management section 22 generates new bundled-link information when it finds that the new path is the first component link in the bundled link, and returns the bundled-link information to the path management section 21.

The path management section 21 requests the route calculation section 31 to calculate the route of the path to be set, and determines the route. Then, when the path is a bi-directional path, the path management section 21 requests the resource management section 24 to assign a reverse-direction-path (from the node D to the node B) resource.

Next, the path management section 21 reports the bundled-link information to the signaling control section 25, and requests the signaling control section 25 to send a path setting request. The signaling control section 25 adds conventional path information to the path-setting-request message, further adds the bundle-link information, which is incorporated by the present invention, and sends the message to the receiving-side node, the node D, through the control-channel interface section 50.

When the node D, which is the receiving-side node, receives the path-setting-request message, the control-channel interface section 50 reports the message to the signaling control section 25, the signaling control section 25 extracts the contents (including the bundled-link information, incorporated by the present invention) of the path-setting-request message, and the signaling control section 25 passes the contents to the path management section 21.

The path management section 21 recognizes that the local node is the receiving-side node, and generates path information. Conventionally, since a bundled link is not specified by signaling, a bundle management section is not activated in a path-setting process. In the present invention, however, the path management section 21 reports the bundled-link information to the bundle management section 22 to request bundle setting.

In the present invention, the bundle management section 22 specifies bundle management information according to the bundled-link information received from the path management section 21 and returns the bundle management information to the path management section 21, as in the transmission-side node. Then, the path management section 21 requests the resource management section 24 to assign a positive-direction-path (from the node B to the node D) resource.

The path management section 21 reports the assigned resource information to the signaling control section 25, and requests the signaling control section 25 to send a path-setting response message. If the path is a bi-directional path, the path management section 21 requests the route-information control section 32 to advertise the route information of the bundled link.

In the present invention, the route-information control section 32 specifies the information of the bundled link, not that of each individual link, in the route-information DB 34, and reports the bundled-link information to the advertisement section 33.

The advertisement section 33 advertises the bundled-link route information of the reverse-direction path. The signaling control section 25, which has been requested to send the message by the path management section 21, generates a path-setting response message and sends it to the transmission-side node, the node B, through the control-channel interface section 50, as in the conventional case.

When the control-channel interface section 50 of the node B, which is the transmission-side node, receives the path-setting response message, it reports the message to the signaling control section 25. The signaling control section 25 extracts the contents of the path-setting response message, and reports the contents to the path management section 21.

The path management section 21 recognizes that setting the bundled link has been completed, updates the path information, and requests the bundle management section 22 to perform the final bundle setting. In the present invention, the bundle management section 22 performs the "completion" setting of the bundle management information according to the bundled-link information, and returns it to the path management section 21.

The path management section 21 reports the bundled-link route information to the route-information control section, and requests advertisement. In the present invention, the advertisement section 33 advertises the route information of the positive-direction path as that of the bundled link, in the network through the control-channel interface section 50, as in the receiving-side node. After the path management section 21 requests the route-information control section 32 to perform advertisement, the path management section 21 reports the completion of bundled-link setting to the command interface control section 40.

With this, the path has been set as a bundled link, and the transmission-side node and the receiving-side node can automatically generate a bundled link and advertise route information.

Next, how a component link is added to a bundled link will be described. In the conventional technology, bundle is specified for a path which has already been set, but there is no definite means to add a component link to a bundled link.

Figure 46:
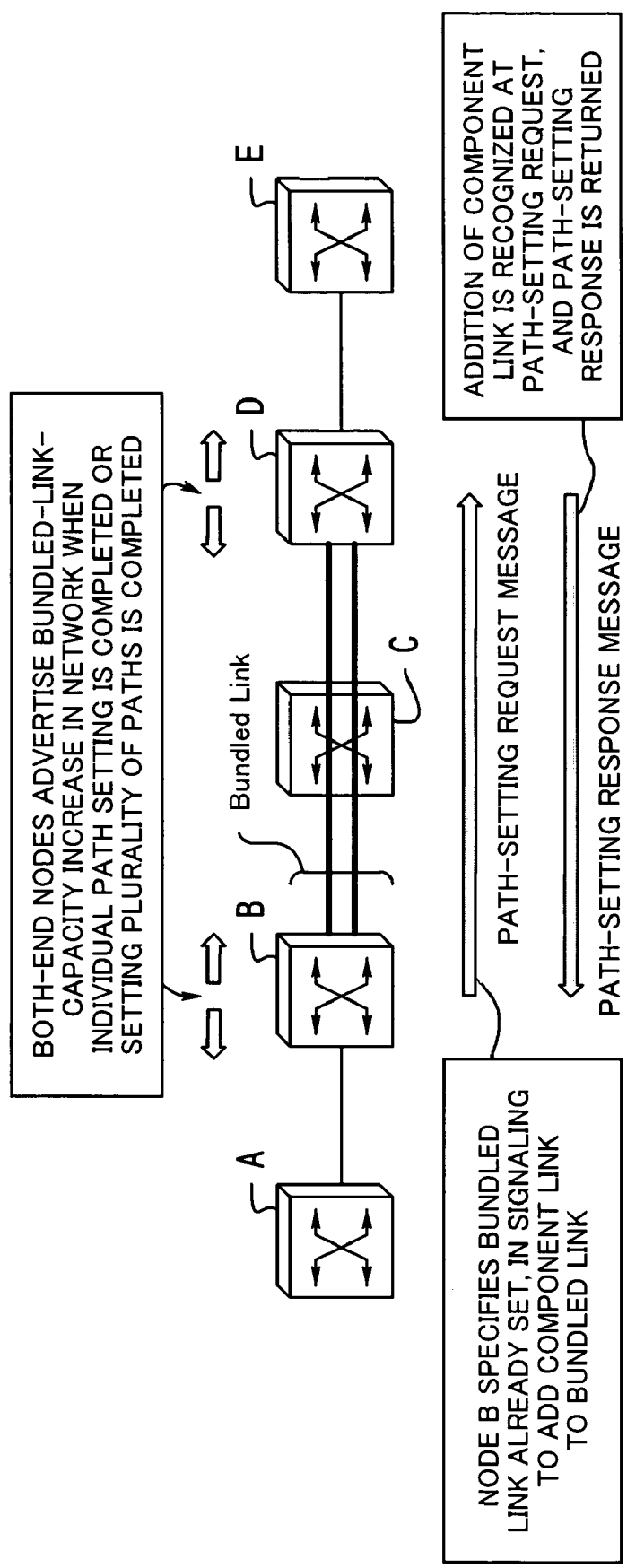
FIG. 46 shows the addition of a component link to a bundled link.

FIG. 46 shows the addition of a component link to a bundled link. A node A to a node E are connected in series. When a component link is added to a bundled link in the present invention, as shown in the figure, the bundled link to which the component link is to be added is specified by signaling to set the path to be added.

When the administrator requests path setting and specifies whether route information is to be advertised after path setting, both end nodes of the path advertises advertise route information as bundled-link information indicating that the capacity of the bundled link has been increased after each individual path has been set or after a plurality of paths has been set.

When the command interface control section 40 of the node B receives a component-link addition command, it reports the command and its parameter to the path management section 21. The parameter includes whether route information is to be advertised after path setting, which is incorporated by the present invention.

In the conventional technology, there is no definite means to add a component link to a bundled link. In the present invention, however, the path management section 21 generates the information of a path to be set, and reports the information of the bundled link to which the component link is to be added, the destination address of the component link to be set, and others to the bundle management section 22 to request the addition to the bundled link.

In the present invention, when the bundle management section 22 recognizes that the bundled link to which the component link is to be added and the component link to be added have the same destination address, the bundle management section 22 updates the bundled-link information, and returns it to the path management section 21. The path management section 21 requests a path route calculation and a resource assignment, but since the operations thereof have been mentioned above, a description of the operations is omitted here.

Next, the path management section 21 requests the signaling control section 25 to send a path-setting request as in the conventional case. In the present invention, in addition to conventional path information, the path management section 21 reports the information of the bundled link to which the component link is to be added, to the signaling control section 25 to request to send a path-setting request message for setting the path as a bundled link.

In the present invention, the signaling control section 25 adds the information of the bundled link to which the component link is to be added, to the path-setting request message. This message includes whether route information is advertised or not. The signaling control section 25 sends the message to the receiving-side node, the node D, through the control-channel interface section 50.

When the node D, which is the receiving-side node, receives the path-setting request message, the message reaches the path management section 21 through the control-channel interface section 50 and the signaling control section 25. As described above, the path management section 21 reports the bundled-link information to the bundle management section 22 to request bundle setting.

In the conventional technology, there is no definite means to add a component link, in a bundle management section. In the present invention, however, the bundle management section 22 recognizes the addition of the component link from the bundled-link information received from the path management section 21, increases the bandwidth of the bundled link by that of the component link, and returns the information to the path management section 21.

Next, the path management section 21 requests a resource assignment, the transmission of a path-setting response message, and the advertisement of the bundled-link route information, but since the operations thereof have been mentioned above, a description of the operations is omitted here.

Conventionally, a route-information control section applies processing to a path which has already been set. In the present invention, however, the route-information control section 32 specifies in the route-information DB 34 that the bandwidth of the bundled link has been increased by that of the component link, and determines according to the designation of whether route information is advertised whether the bundled-link route information is advertised.

When the bundled-link route information is advertised, the route-information control section 32 does not advertise the information as that of another path but generates advertisement information indicating that the bandwidth of the bundled link has been increased, and asks the advertisement section 33 to advertise it. In response to the request, the advertisement section 33 advertises the route information through the control-channel interface section 50.

The signaling control section 25, which is requested by the path management section 21 to send a message, generates a path-setting response message and sends it to the transmission-side node, the node B, through the control-channel interface section 50, as in the conventional case.

When the node B, which is the transmission-side node, receives the path-setting response message, the message reaches the path management section 21 through the control-channel interface section 50 and the signaling control section 25. In the present invention, the path management section 21 recognizes that component-link setting has been completed, updates the path information, and reports to the bundle management section 22 that component-link setting has been completed.

In the present invention, the bundle management section 22 increases the bandwidth of the bundled link by that of the component link according to the bundled-link information, and returns it to the path management section 21. The path management section 21 reports the bundled-link route information to the route-information control section 32 to requests advertisement. Since the advertisement section 33 has been described, a description thereof is omitted here. After the advertisement request to the route-information control section 32, the path management section 21 reports the command interface control section 40 that bundled-link setting has been completed.

With this, path setting has been specified for the component link added to the bundled link, and the transmission-side node and the receiving-side node can advertise the route information with the addition of the component link being changed to the change in the bandwidth of the bundled link.

When a bundled link is generated from 10 component links, for example, it is possible that path setting is specified for the first to ninth component links with the designation which indicates that route information is not advertised after path setting, and path setting is specified for the tenth component link with the designation which indicates that route information is advertised, so that information is collectively advertised after a plurality of paths has been specified.

Figure 47:
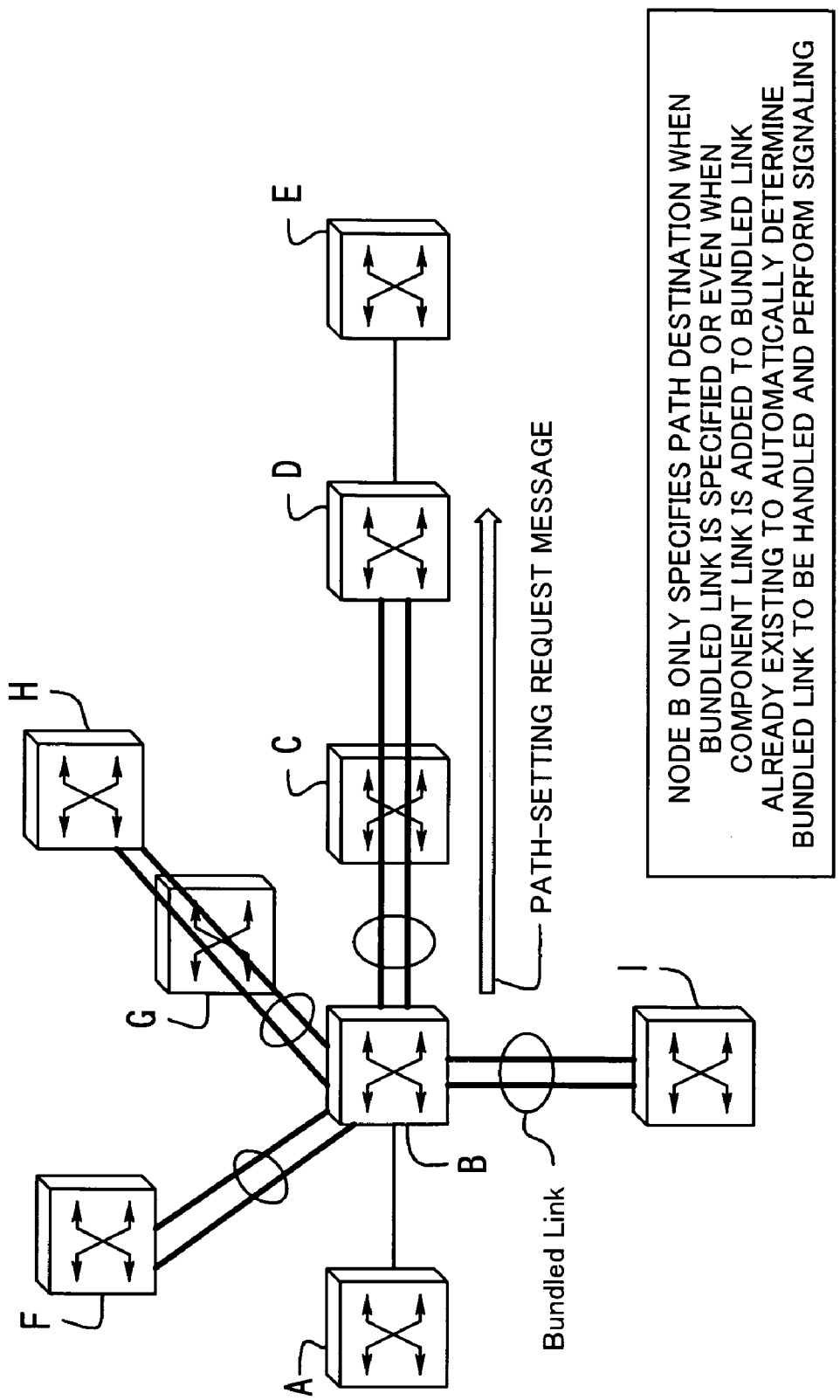
FIG. 47 shows automatic recognition of a bundled link.
Figure 48:
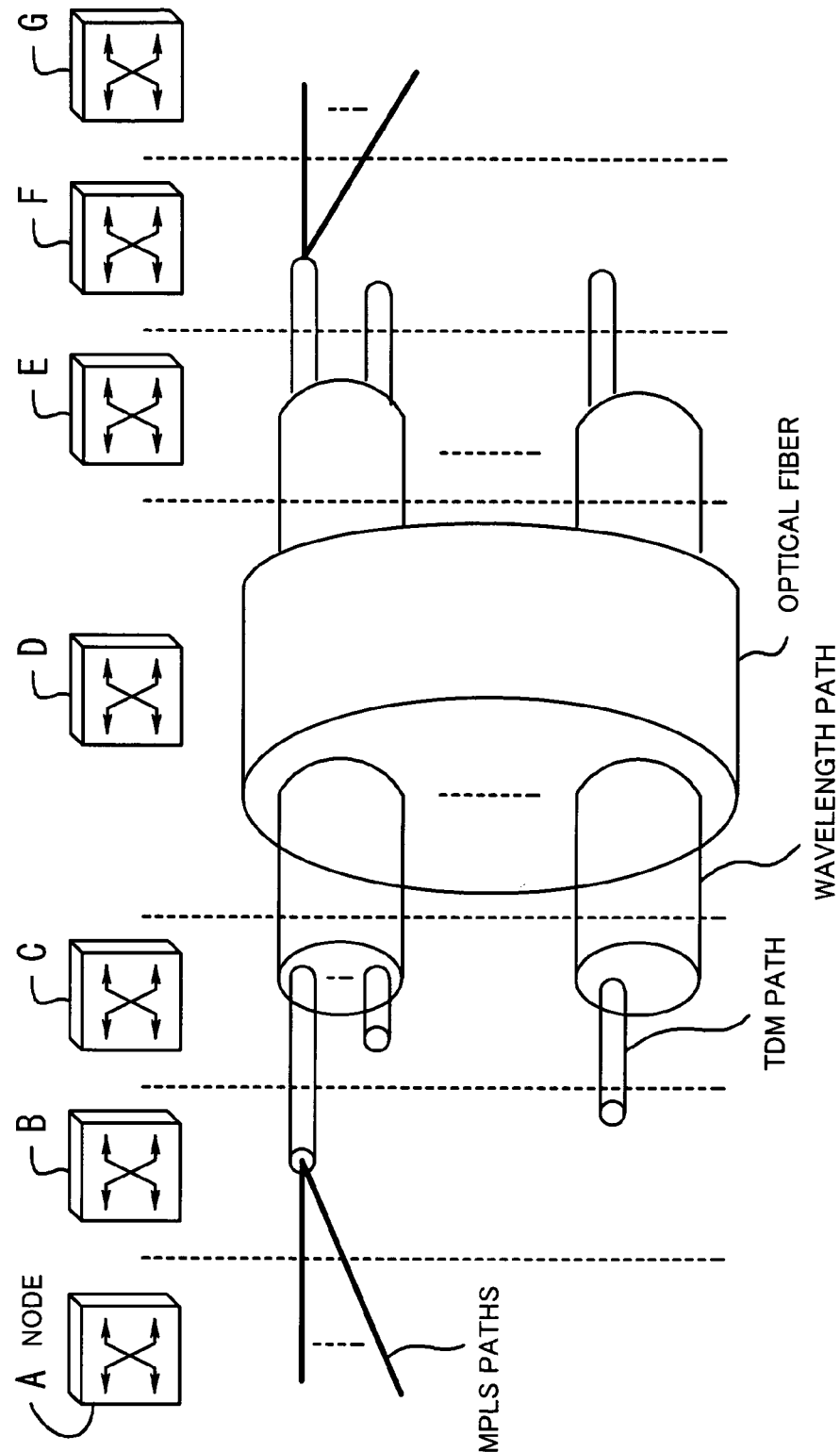
FIG. 48 shows the concept of a path multiplex structure.
Figure 49:
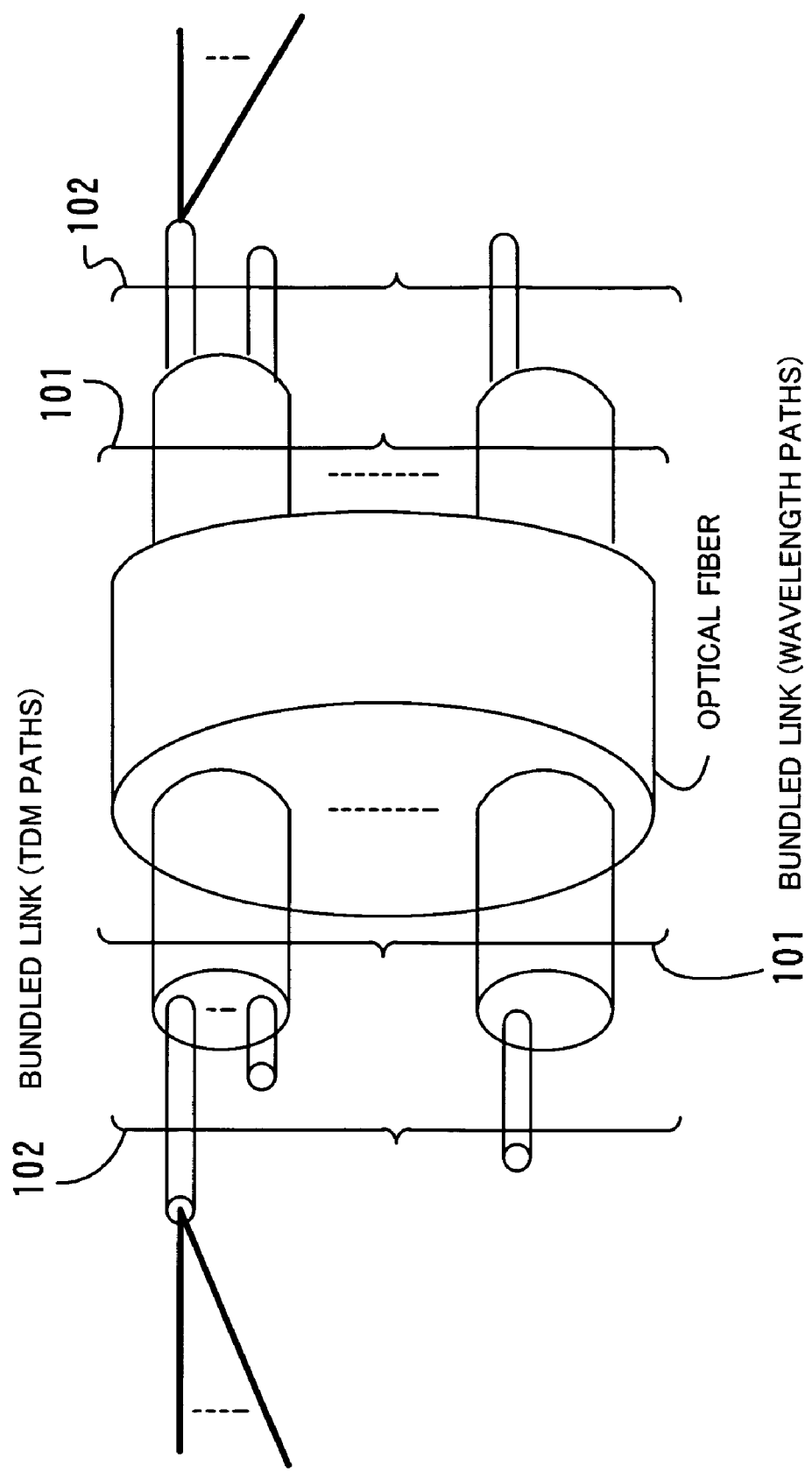
FIG. 49 shows the concept of link bundling.

Automatic recognition of a bundled link will be described next. FIG. 47 shows automatic recognition of a bundled link. A node A to a node E are connected in series, the node B is connected to nodes F, I, and G, and the node G is connected to a node H. The figure shows that bundled links have been already specified between the node B and various nodes.

In such a condition, if the administrator performs path setting with a bundled link specified, it may cause low work efficiency or a human error. In the present invention, when a new bundled link is specified, or when a component link is added to a bundled link which has already existed, the administrator just needs to specify the destination, as in usual path setting, without specifying the bundled link. Nodes search for a bundled link having the destination. When a bundled link having the destination exists, it is deemed that a component link is added to the bundled link. When a bundled link having the destination does not exist, it is deemed that new bundled-link setting is to be performed, and signaling is performed.

When the command interface section 40 of the node B receives a path setting command, the command interface section 40 reports the command and its parameter to the path management section 21. The parameter includes the destination address.

The path management section 21 reports the bundled-link information (such as the destination address) to the bundle management section 22 to request bundled-link setting. In the present invention, when a bundled link is not specified, the bundle management section 22 requests the bundle search section 23, which is newly added in the present invention, to search for a bundled link to be handled.

The bundle search section 23 searches bundled links which have already existed by the destination address to extract a bundled link to be handled, and reports the result to the bundle management section 22. When a bundled link to be handled exists, the bundle management section 22 deems that the component link is added to the bundled link. When a bundled link to be handled does not exist, the bundle management section 22 deems that new bundled-link setting is to be performed. The bundle management section 22 starts setting. With this, paths having the same destination can be automatically tied up to one path.

Advantages of the present invention will be described next. The difference between the conventional technology and the present invention will be shown in a case in which m links are specified and they are set to a bundled link, and then again, m links are specified and they are set to a bundled link.

(1) When m links are set to one bundled link, since the route information of the m links has already been advertised, each node needs to manage the m routes and perform route calculation in the conventional technology. In the present invention, however, since the route information of just one link is advertised, each node needs to handle the amount of route information which is 1/m of the amount of route information used in the conventional technology.

(2) When m links are set to one bundled link, the route information of the m links has already been advertised m times in the conventional technology. In the present invention, however, since bundled-link route information is advertised only once after the m links are set, the number of times advertisement is performed is reduced to 1/m of the number of times advertisement is performed in the conventional technology.

(3) The above items (1) and (2) apply to one node. When the same setting is performed at n nodes in a network in the present invention, the amount of route information and the number of times advertisement is performed are reduced to 1/(m×n) of those performed in the conventional technology.

Since bundle setting is autonomously performed with a bundled link being specified by signaling, bundle design, bundle configuration, and bundle maintenance conventionally performed by the administrator manually are significantly reduced, and a human error is eliminated. In addition, since a bundled link to which a component link is to be added is automatically determined, the administrator does not need to specify a bundled link, allowing further highly efficient maintenance.

Further, in the present invention, When a component link is added, a bundled link does not need to be released, and advertisement is performed with the bandwidth of the bundled link being increased. Therefore, a network which does not perform useless route-information advertisement can be configured.

As described above, in a transfer system according to the present invention, the transmission side specifies for the receiving side a path as a bundled link which can have a plurality of paths tied up, between nodes, and the receiving side recognizes the path and sets it as a bundled link, and the transmission side and the receiving side advertise route information in the network. Therefore, the amount of route information and the number of times advertisement is performed are reduced, and maintenance and management are made to be highly efficient to implement improved transfer quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transfer system for applying transfer control to bundling in which a plurality of paths are tied up to one path, comprising:

a first node outputting MPLS (multi-protocol label switching) paths;

a MPLS over TDM (time division multiplexing) node connected to the first node and converting the MPLS paths to TDM paths, the MPLS paths being multiplexed in the TDM paths;

a TDM over wavelength_node connected to the MPLS over TDM node and converting the TDM paths to wavelength paths, the TDM paths being multiplexed in the wavelength paths;

a cross-connect node connected to the TDM over wavelength node and performing cross-connect control of the wavelength paths;

a wavelength over TDM node connected to the cross-connect node and converting the wavelength paths to new TDM paths, the wavelength paths being divided to the new TDM paths;

a TDM over data node connected to the wavelength over TDM node and converting the new TDM paths to new MPLS paths, the new TDM paths being divided to the new MPLS paths;

a second node connected to the TDM over data node and receiving the new MPLS paths;

a transmission-side transfer apparatus; and a receiving-side transfer apparatus;

(1) the transmission-side transfer apparatus comprising:

a path setting section for specifying a path between nodes for the receiving-side transfer apparatus as a bundled link which has a plurality of paths tied up; and a transmission-side route-information advertisement section for advertising route information in a network when recognizing that the path has been established; and (2) the receiving-side transfer apparatus comprising:

a path recognition section for recognizing the path and setting the path as the bundled link; and a receiving-side route-information advertisement section for advertising the route information in the network when recognizing that the path has been established, (3) wherein the path setting section adds or deletes a component link to or from the bundled link, the path recognition section recognizes that the component link has been added to or removed from the bundled link, and the transmission-side route-information advertisement section and the receiving-side route-information advertisement section advertise the addition or deletion of the component link in the network as a change in the bandwidth of the bundled link, (a) the TDM over wavelength node including the transmission-side transfer apparatus, and the 4 wavelength over TDM node including the receiving-side transfer apparatus, wherein, when the wavelength path is added or deleted as the component link to a first bundled link, the first bundled link being the wavelength paths tied up, the transmission-side route-information advertisement section advertises the addition or deletion of the wavelength path as a change in the bandwidth of the first bundled link to the MPLS over TDM node and the cross-connect node, and the receiving-side route-information advertisement section advertises the addition or deletion of the wavelength path as a change in the bandwidth of the first bundled link to the cross-connect node and the TDM over MPLS node, (b) the MPLS over TDM node including the transmission-side transfer apparatus, and the TDM over wavelength_ node including the receiving-side transfer apparatus, wherein, when the TDM path is added or deleted as the component link to the second bundled link, the second bundled link being the TDM paths tied up, the transmission-side route-information advertisement section advertises the addition or deletion of the TDM path as a change in the bandwidth of the second bundled link to the first node and the TDM over wavelength node, and the receiving-side route-information advertisement section advertises the addition or deletion of the TDM path as a change in the bandwidth of the second bundled link to the MPLS over TDM node and the cross-connect node, and (c) the wavelength over TDM node including the transmission-side transfer apparatus, and the TDM over MPLS node including the receiving-side transfer apparatus, wherein, when the new TDM path is added or deleted as the component link to a third bundled link, the third bundled link being the new TDM paths tied up, the transmission-side route-information advertisement section advertises the addition or deletion of the new TDM path as a change in the bandwidth of the third bundled link to the cross-connect node and the TDM over MPLS node, and the receiving-side route-information advertisement section advertises the addition or deletion of the new TDM path as a change in the bandwidth of the third bundled link to the wavelength over TDM node and the second node.

2. The transfer system according to claim 1, wherein, when the path setting has been completed by signaling, the transmission-side route-information advertisement section and the receiving-side route-information advertisement section advertise the route information of the bundled link serving as a new bundled link or advertise the route information by increasing or decreasing the bandwidth of the bundled link which has already existed by the bandwidth of a component link, caused by the addition or deletion of the component link, to advertise that the bandwidth of the bundled link has been virtually increased or decreased.

3. The transfer system according to claim 1, wherein, after setting a plurality of paths has been completed, the transmission-side route-information advertisement section and the receiving-side route-information advertisement section collectively advertise the route information.

4. The transfer system according to claim 1, wherein, when the path is set, the path setting section performs search processing for a bundled link which has already existed, according to a specified destination address; when a bundled link to be handled does not exist, the path setting section specifies a new bundled link; and when a bundled link to be handled exists, the path setting section determines that a component link is to be added and ties up paths having the same destination into one path.

5. The transfer system according to claim 1, wherein the path setting section specifies information explicitly indicating that bundling is to be performed, in signaling when the path is set as the bundled link or when a component link is added to the bundled link; and the path recognition section controls the bundled-link setting or the addition of the component link according to the information reported by signaling to make the transmission-side transfer apparatus and the receiving-side transfer apparatus operate synchronously.

* * * * *